(12) United States Patent
Christiansson

(10) Patent No.: US 9,024,916 B2
(45) Date of Patent: May 5, 2015

(54) EXTRACTING TOUCH DATA THAT REPRESENTS ONE OR MORE OBJECTS ON A TOUCH SURFACE

(75) Inventor: Tomas Christiansson, Torna-Hällestad (SE)

(73) Assignee: Flatfrog Laboratories AB, Lund (SE)

( * ) Notice: Subject to any disclaimer, the term of this patent is extended or adjusted under 35 U.S.C. 154(b) by 437 days.

(21) Appl. No.: 13/502,691

(22) PCT Filed: Oct. 13, 2010

(86) PCT No.: PCT/SE2010/051103
§ 371 (c)(1),
(2), (4) Date: Jun. 27, 2012

(87) PCT Pub. No.: WO2011/049511
PCT Pub. Date: Apr. 28, 2011

(65) Prior Publication Data
US 2012/0268403 A1    Oct. 25, 2012

Related U.S. Application Data

(60) Provisional application No. 61/272,667, filed on Oct. 19, 2009.

(30) Foreign Application Priority Data

Oct. 19, 2009 (SE) ...................... 0950770

(51) Int. Cl.
*G06F 3/042* (2006.01)
(52) U.S. Cl.
CPC ............. *G06F 3/0421* (2013.01); *G06F 3/042* (2013.01); *G06F 2203/04109* (2013.01)
(58) Field of Classification Search
CPC ........................ G06F 2203/04109; G06F 3/042
USPC .................................. 345/173, 175, 176, 178
See application file for complete search history.

(56) References Cited

U.S. PATENT DOCUMENTS

| 3,673,327 | A | 6/1972 | Johnson et al. |
| 4,254,333 | A | 3/1981 | Bergstrom |

(Continued)

FOREIGN PATENT DOCUMENTS

| WO | WO 02/07072 | 1/2002 |
| WO | WO 2005/026938 | 3/2005 |

(Continued)

OTHER PUBLICATIONS

International Search Report and Written Opinion issued in International Application No. PCT/SE2010/051107 dated Jan. 24, 2011.

(Continued)

*Primary Examiner* — Gerald Johnson
*Assistant Examiner* — Christopher Kohlman
(74) *Attorney, Agent, or Firm* — Harness, Dickey & Pierce, P.L.C.

(57) ABSTRACT

A touch-sensing apparatus is based on frustrated total internal reflection (FTIR). The apparatus comprises a panel, in which sheets of light are propagated by internal reflection between a touch surface and an opposite surface. A light sensor arrangement is optically connected to the panel to measure transmitted light energy on detection lines across the touch surface. Each detection line represents a light path across the touch surface from a light source to a light sensor. An object that touches the touch surface will frustrate the propagating light and cause a local attenuation among the detection lines. A data processor is connected to the light sensor arrangement and configured to execute a process for extracting touch-related data.

37 Claims, 12 Drawing Sheets

(56) References Cited

U.S. PATENT DOCUMENTS

| | | |
|---|---|---|
| 6,972,753 B1 | 12/2005 | Kimura et al. |
| 7,432,893 B2 | 10/2008 | Ma et al. |
| 2004/0252091 A1 | 12/2004 | Ma et al. |
| 2006/0114237 A1 | 6/2006 | Crockett et al. |
| 2007/0075648 A1 | 4/2007 | Blythe et al. |
| 2008/0122803 A1 | 5/2008 | Izadi et al. |
| 2009/0135162 A1 | 5/2009 | Wijdeven et al. |
| 2009/0153519 A1 | 6/2009 | Suarez et al. |
| 2011/0227874 A1* | 9/2011 | Fahraeus et al. .............. 345/175 |

FOREIGN PATENT DOCUMENTS

| | | |
|---|---|---|
| WO | WO 2006/095320 | 9/2006 |
| WO | WO 2008/032270 | 3/2008 |
| WO | WO 2009/000289 | 12/2008 |
| WO | WO 2009/048365 | 4/2009 |
| WO | WO 2009/102681 | 8/2009 |
| WO | WO 2010/006882 | 1/2010 |
| WO | WO 2010/006883 | 1/2010 |
| WO | WO 2010/006884 | 1/2010 |
| WO | WO 2010/006885 | 1/2010 |
| WO | WO 2010/006886 | 1/2010 |
| WO | WO 2010/134865 | 11/2010 |
| WO | WO 2011/028169 | 3/2011 |
| WO | WO 2011/049512 | 4/2011 |
| WO | WO 2011/049513 | 4/2011 |
| WO | WO 2011/078769 | 6/2011 |
| WO | WO 2011/139213 | 11/2011 |

OTHER PUBLICATIONS

Christer Ericson, "Real-Time Collision Detection", The Morgan Kaufmann Series in Interactive 3D Technology (2005) Chapters 5-9, pp. 125-412.

Joseph O'Rourke, "Computational Geometry In C", Second Edition, Cambridge University Press, (1998), pp. 252-264.

Kak et al, "Principles of Computerized Tomographic Imaging", (1999), The Institute of Electrical Engineers, Inc.

Natterer, et al., "Mathematical Methods in Image Reconstruction", Society for Industrial and Applied Mathematics, (2001).

International Search Report and Written Opinion issued in International Application No. PCT/SE2010/051105 dated Nov. 16, 2010.

Natterer, "The Mathematics of Computerized Tomography", Classics in Applied Mathematics; 32, 2001.

Press, et al., "Numerical Recipes The Art of Scientific Computing", Third Edition, Cambridge University Press, 2007, pp. 1-1235.

Barzilai et al., "Two-Point Step Size Gradient Methods", IMA Journal of Numerical Analysis, 1988, pp. 141-148.

Karsten Fourmont, Non-Equispaced Fast Fourier Transforms with Applications to Tomography, The Journal of Fourier Analysis and Applications, vol. 9, Issue 5, 2003, pp. 431-450.

International Search Report and Written Opinion issued in International Application No. PCT/SE2010/051103 dated Jan. 25, 2011.

* cited by examiner

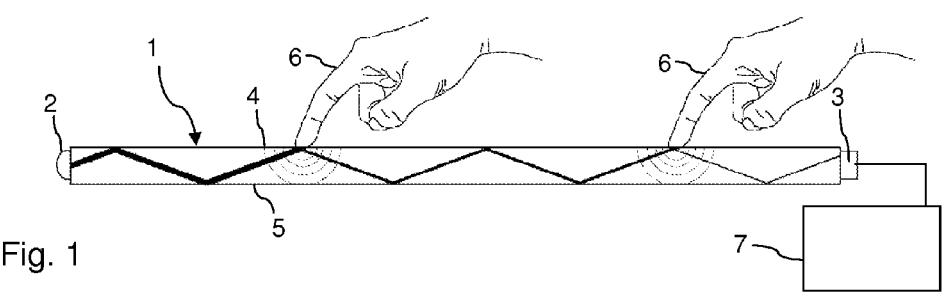
Fig. 1
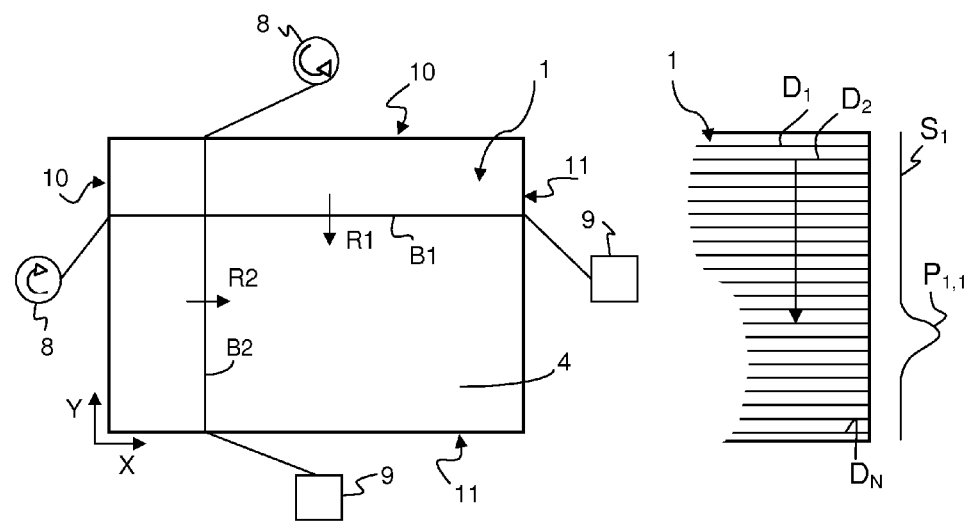
Fig. 2A
Fig. 2B
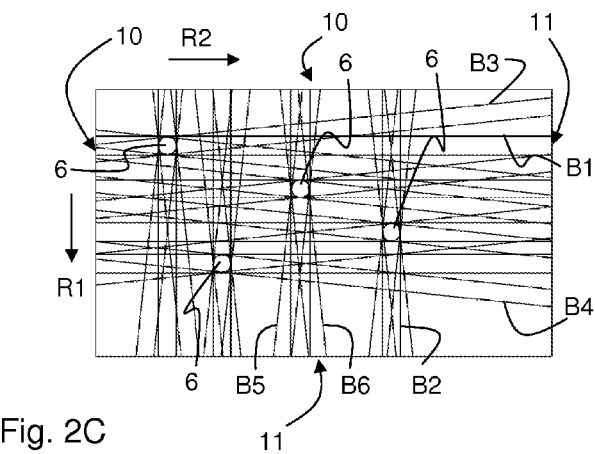
Fig. 2C

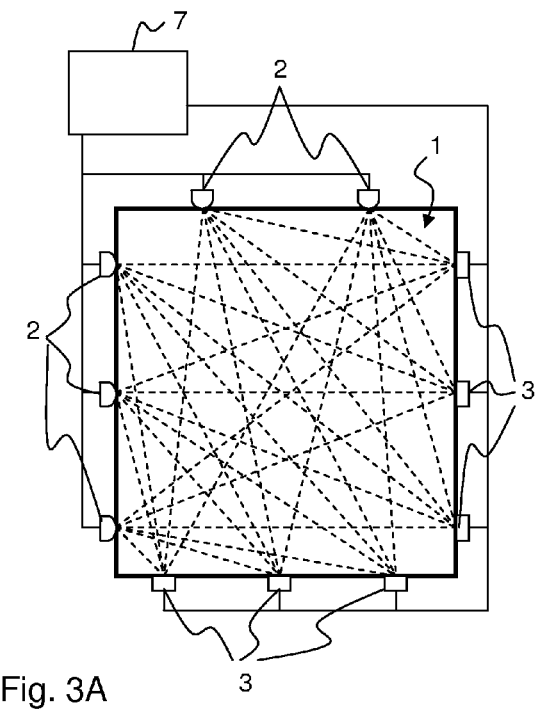
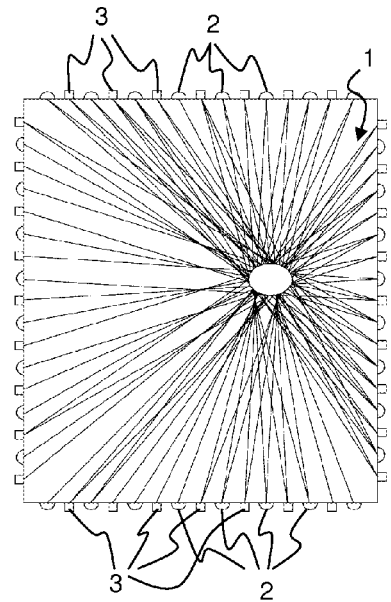
Fig. 3A  Fig. 3B
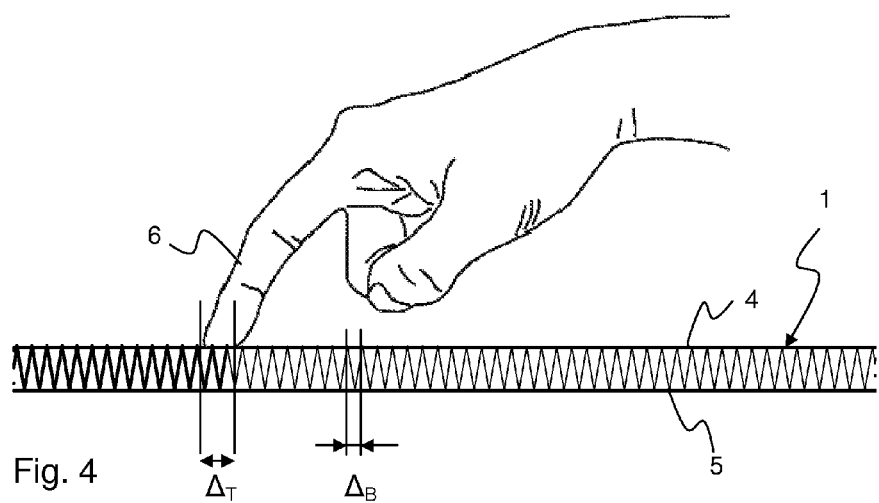
Fig. 4

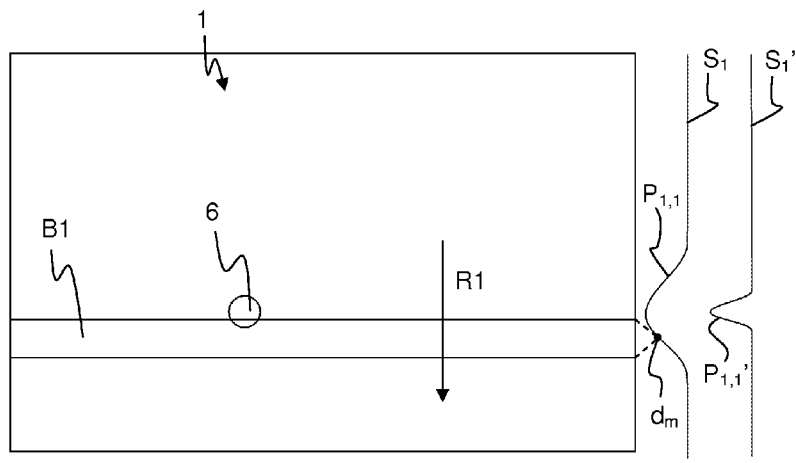
Fig. 11
Touch signature width
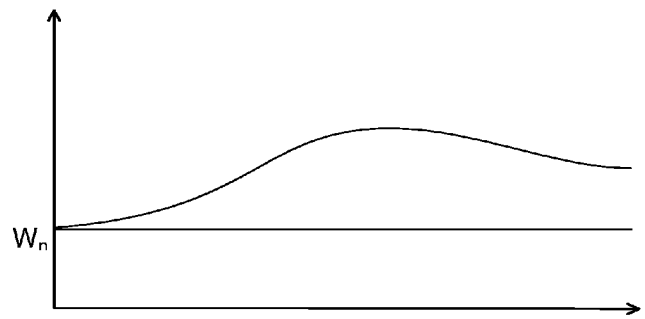
Fig. 12A      Distance from entry point
Factual width
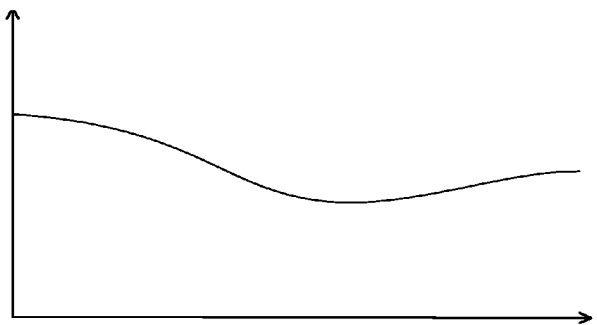
Fig. 12B      Distance from entry point

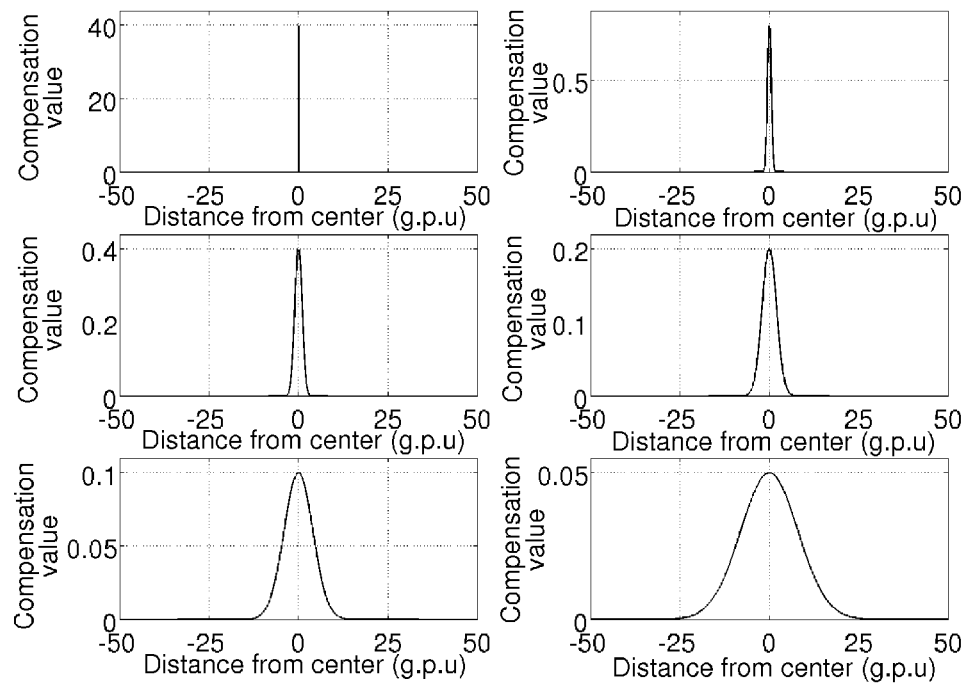
Fig. 14
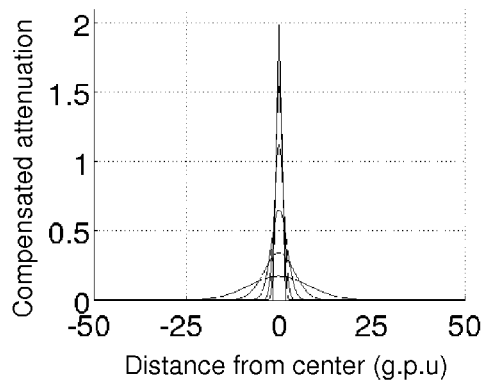 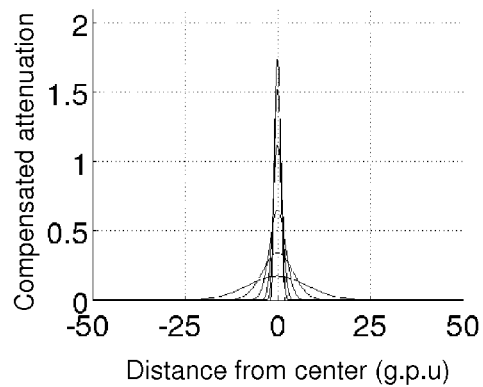
Fig. 15A    Fig. 15B

EXTRACTING TOUCH DATA THAT REPRESENTS ONE OR MORE OBJECTS ON A TOUCH SURFACE

CROSS-REFERENCE TO RELATED APPLICATIONS

The present application claims the benefit of Swedish patent application No. 0950770-8, filed on Oct. 19, 2009, and U.S. provisional application No. 61/272,667, filed on Oct. 19, 2009, both of which are incorporated herein by reference.

TECHNICAL FIELD

The present invention relates to touch-sensitive panels and data processing techniques in relation to such panels.

BACKGROUND ART

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, or by incorporating resistive wire grids, capacitive sensors, strain gauges, etc into the panel.

US2004/0252091 discloses an alternative technique which is based on frustrated total internal reflection (FTIR). Light sheets are coupled into a panel to propagate inside the panel by total internal reflection. When an object comes into contact with a surface of the panel, two or more light sheets will be locally attenuated at the point of touch. Arrays of light sensors are located around the perimeter of the panel to detect the received light for each light sheet. A coarse tomographic reconstruction of the light field across the surface is then created by geometrically back-tracing and triangulating all attenuations observed in the received light. This is stated to result in data regarding the position and size of each contact area.

US2009/0153519 also proposes the use of FTIR for touch detection on a panel and tomographic processing for reconstruction of the light field within the panel. Here, the tomographic processing is based on a linear model of the tomographic system, $Ax=b$. The system matrix $A$ is calculated at factory, and its pseudo inverse $A^{-1}$ is calculated using Truncated SVD algorithms and operated on measurement signals to yield a two-dimensional representation of the light conductivity in the panel: $x=A^{-1}b$. The suggested method is both demanding in the term of processing and lacks suppression of high frequency components, possibly leading to much noise in the two-dimensional representation.

SUMMARY

It is an object of the invention to provide an alternative technique for reconstructing the light field across the touch surface, in particular a technique that enables determination of touch-related data at sufficient precision to discriminate between a plurality of objects in simultaneous contact with the touch surface, and possibly to also discriminate between different types of objects.

This and other objects, which may appear from the description below, are at least partly achieved by means of methods, a computer program product, a device for extracting touch data, and a touch-sensing apparatus according to the independent claims, embodiments thereof being defined by the dependent claims.

A first aspect of the invention is a method in a touch-sensing apparatus. The apparatus comprises a light transmissive panel that defines a touch surface and an opposite surface, a light source arrangement for providing sheets of light inside the panel, wherein said sheets comprise light that propagates by internal reflection between the touch surface and the opposite surface, and a light sensor arrangement for measuring transmitted light energy, wherein the light source arrangement and the light sensor arrangement are arranged to define a grid of detection lines on the touch surface, each detection line representing a light path across the touch surface from the light source arrangement to the light sensor arrangement, and wherein the touch-sensing apparatus is configured such that one or more objects touching the touch surface causes a local attenuation in said grid of detection lines. The method comprises the steps of: obtaining an output vector containing signal values indicative of light received by the light sensor arrangement on a set of detection lines; representing a two-dimensional attenuation field on the touch surface by at least one two-dimensional basis function, wherein the or each basis function defines an attenuation strength within its two-dimensional extent; and calculating an estimated attenuation field, based on a mapping of said set of detection lines to the or each basis function, by optimizing at least one of the attenuation strength and the location of the or each basis function such that the estimated attenuation field yields the output vector; and processing the estimated attenuation field for extraction of touch data relating to said one or more objects.

The first aspect results in a two-dimensional estimation of the attenuation field across the touch surface, i.e. a spatial distribution of attenuation values, in which each touching object typically appears as a region of changed attenuation. Thereby, the attenuation field may be processed to discriminate between multiple objects that are brought in contact with touch surface at the same time. Further, it is possible to extract two-dimensional touch data, e.g. the position and/or the attenuation of each touching object within the coordinate system of the touch surface. Other types of touch data include area and/or shape of each touching object, which allows further discrimination between different objects. Since, for an object of given size, the contact area may be a function of applied pressure, at least for flexible objects (e.g. fingertips), the contact pressure between the object and the touch surface may also be estimated for each touching object.

As used herein, "the attenuation field" and "attenuation values" may be given in terms of an absolute measure, such as light energy, or a relative measure, such as relative attenuation (e.g. a fraction or percentage given by the ratio of light energy to a reference/background value) or relative transmission. However, as used in the detailed description further below, "attenuation" is generally synonymous with relative attenuation.

According to the first aspect, the attenuation field is modeled in terms of a set of two-dimensional basis functions (which may be a single basis function). Each basis function needs not be a basis function in the strict mathematical sense, but is rather a building block that can be used to represent, wholly or at least partly, basic (touch-related) shapes that occur in the attenuation field of a touch-sensing apparatus. Thereby, the system response of the touch-sensing apparatus can also be modeled in terms of basis function(s), specifically in terms of the mapping between each detection line and the set of basis functions. For example, the mapping may be given as a formula that expresses, for each detection line, the total attenuation/transmission of the detection line based on the interaction between the detection line and the basis function(s). Thus, a set of such formulas provides a relation between the attenuation strength and/or the location of the basis function(s) and the expected signal values on the set of detection lines. Using such a relation, it is possible to estimate the attenuation field by optimizing at least one of the attenuation strength and the location of the basis function(s) so as to determine the attenuation field that would yield the output vector, i.e. the observed signal values. The aforesaid mapping may be obtained analytically and/or experimentally for a specific touch-sensing apparatus. The expression "yield the output vector" does not require an exact match, but it is also possible that the optimization results in an estimated attenuation field that approximately produces the observed signal values.

The use of one or more basis functions for representing the attenuation field thus provides a convenient way to describe the system response. As will be shown in the following, the use of basis function(s) also makes it possible to make simple modification of the relation describing the system response to account for manufacturing variations between different items of the touch-sensing apparatus. The use of basis functions also enables efficient determination of the attenuation field within one or more subsets of the touch surface.

There are different approaches to implementing the use of basis functions. In one embodiment, each basis function is designed to represent the attenuation caused by a single touching object. In the optimization, the basis function may be movable within the representation of the attenuation field, whereby the location of each basis function is obtained such that the influence of the resulting attenuation field on the set of detection lines approximately matches the signal values in the output vector.

In another embodiment, the attenuation field is represented by a plurality of basis functions, which are arranged in a reconstruction grid on the touch surface. Thus, each basis function has a known and fixed location in the reconstruction grid. This may facilitate the mapping between the detection lines and the basis functions, since both the location of the detection lines and the location of the basis functions are known. In such an embodiment, each basis function may be defined by an attenuation parameter. The use of basis functions that are defined by an attenuation parameter may facilitate the evaluation of the interaction between the detection lines and the basis functions, especially if the basis functions have identical extent and differ only by their location and the value of the attenuation parameter. Thereby, the evaluation can be reduced to calculating the interaction between different detection lines and a default basis function that represents all basis functions in the reconstruction grid. For each basis function, the calculation of the interaction results in a value which is scaled by the attenuation parameter of the basis function.

In one embodiment, the attenuation parameter is the attenuation strength at the center point of the extent. This may facilitate the evaluation of interaction between the detection lines and the basis functions.

In one embodiment, each basis function is centered on a respective vertex in the reconstruction grid. This may facilitate the representation of the attenuation field, especially when the reconstruction grid defines a regular arrangement of vertices.

In one embodiment, the reconstruction grid is triangular. The use of a triangular grid has been found to improve the ability of the estimated attenuation field to properly represent the elliptical shapes that commonly occur in the attenuation field as a result of touching objects.

In one embodiment, the basis functions have identical extent. This may further facilitate the evaluation of the interaction between the detection lines and the basis functions.

In one embodiment, each basis function has a hexagonal extent, preferably a regular hexagonal extent.

In one embodiment, each basis function defines a decreasing attenuation with increasing distance from the center point of the extent. By arranging such basis functions to partially overlap, it is possible to obtain a higher resolution of the estimated attenuation field without excessive processing, since adding together contributions from all interactions with basis functions along a detection line may directly result in an interpolation among the attenuation parameters in the reconstruction grid. The interpolation improves the ability of the estimated attenuation field to mimic a true (actual) attenuation field on the touch surface. For computational efficiency, each basis function may be designed with zero attenuation in all but one vertex in the reconstruction grid. For example, each basis function may be arranged with its extent centered on a vertex, and the corner points of the extent having zero attenuation and coinciding with the neighboring vertices. In such an embodiment, if each basis function has a regular hexagonal extent, each grid point will have the same distance to all of its neighboring vertices, which may facilitate the calculation of the estimated attenuation field. In one embodiment, each basis function defines a linearly decreasing attenuation, resulting in a linear interpolation within the reconstruction grid.

In one embodiment, in which the signal values for each sheet of light form a projection signal which is indicative of the spatial distribution of light within an outcoupling site on the light transmissive panel, the method further comprises: identifying, for each sheet of light, a sheet kernel for each basis function, wherein the sheet kernel is generated to represent the resulting projection signal when the basis function attenuates the sheet of light.

The sheet kernel may be determined either by theoretical calculations based on the optical design of the touch-sensing apparatus, or by measurements in an actual touch-sensing apparatus, or a combination thereof. The use of a sheet kernel may facilitate the generation of the aforesaid mapping, and specifically the evaluation of the interaction between a basis function and the detection lines of a particular sheet of light. In one such embodiment, the mapping is generated, for each detection line, by: identifying all intersections between the detection line and said plurality of basis functions; and deriving, for each basis function that intersects the detection line, an attenuation fraction value $r_{v,j}$ by mapping the intersection to the sheet kernel. Furthermore, the mapping may further be generated by: estimating each output value $d_m$ in the output vector d as $\Sigma r_{v,j} \cdot a_v$, wherein the sum is calculated over all basis functions that intersect detection line $D_j$, and $a_v$ is the attenuation parameter of the respective basis function.

In one embodiment, the sheet kernel is generated by: generating an estimated sheet kernel by estimating the attenuation of the sheet of light caused by the basis function as a function of distance to a light ray in the sheet of light passing through the center of the basis function. For example, the estimated sheet kernel may be determined based on theoretical calculations. Alternatively, the estimated sheet kernel may be determined experimentally.

In certain optical designs, the same sheet kernel (a standard sheet kernel) may be used for all basis functions in the reconstruction grid, whereas in other optical designs the sheet kernel may vary between basis functions.

In one embodiment, the sheet kernel may further be generated by: obtaining a compensation kernel which represents a dependence of signal profile width on location of the basis function on the touch surface due to light scattering caused by at least one of the touch surface and the opposite surface, and modifying the estimated sheet kernel based on the compensation kernel. The compensation kernel may alternatively or additionally account for other causes for non-theoretical detection lines, such as beam widths and intensity profiles, extended light incoupling points and light outcoupling points on the panel, generation of light sheets by sweeping of beams, etc.

By obtaining the compensation kernel, it is possible to modify an estimated sheet kernel to more accurately take into account the true light paths across the touch surface, even if the light is scattered during its propagation through the panel. Further, the modification may be done in a simple way. For example, all basis functions may be associated with a standard sheet kernel, which is individually modified for each basis function based on the compensation kernel, e.g. by convolving the compensation kernel with the estimated sheet kernel.

The dependence of signal profile width on location of the basis function may be determined either by theoretical calculations, or by measurements on an actual touch-sensing apparatus. In one embodiment, the width of the compensation kernel is determined based on a width function that represents the factual width of an object that generates a given signal feature in the projection signal, as a function of distance to the outcoupling site.

The use of sheet kernels and compensation kernels, if applicable, may be regarded as an implementation of a general concept in which the mapping to be used when calculating the estimated attenuation field is generated, for each detection line, as an aggregation of line integrals, wherein each line integral is evaluated along an intersection between the detection line and a respective basis function. In one implementation, the aggregation function is a summation function. The line integral may be evaluated to represent the area under the intersection between the detection line and the basis function. In certain embodiments, the detection line may be assigned a width and/or an intensity profile in the plane of the touch surface, caused by physical properties of the touch-sensing apparatus, as mentioned above. In such embodiment, the mapping may be generated to account for at least one of the width and the intensity profile of the detection line.

In one embodiment, the method further comprises obtaining a generic mapping for a series of corresponding touch-sensing apparatuses; measuring calibration parameters for an individual touch-sensing apparatus in said series; and obtaining an item-specific mapping by adapting the generic model function based on the calibration parameters. This may serve to increase the throughput in manufacture of the touch-sensing apparatus, while enabling a high precision in estimating the attenuation field.

In one embodiment, the step of adapting the generic mapping includes adapting the sheet kernels which are used in the generic mapping. For example, the calibration parameters may be sheet kernels measured for each individual touch-sensing apparatus, suitably at only a few locations on the touch surface (i.e. a low density measurement). In another example, the calibration parameters may be data (width function, location of detection lines, etc) that enables calculation of sheet kernels for each individual touch-sensing apparatus.

In one embodiment, the step of calculating the estimated attenuation field is based on Bayesian inversion according to: $p(a|d) = \kappa \cdot p(a) \cdot p(d|a)$, wherein a is an attenuation vector containing one attenuation value $a_v$ for each basis function, $\kappa$ is a constant, $p(a)$ is a prior distribution which represents the probability distribution of the attenuation values $a_v$ in the attenuation field independently of the output vector d, $p(d|a)$ is a likelihood distribution which represents the probability distribution of the signal values $d_m$ given the attenuation vector a, and $p(a|d)$ represents the probability distribution of the attenuation values $a_v$ given the output vector d. In such an embodiment, the estimated attenuation field is obtained based on statistical modeling and processing of the signal values. The statistical approach makes it possible to achieve adequate precision of the estimated attenuation field even if the grid of detection lines is thin, causing the output vector to contain a sparse set of signal values. A thin grid may arise if few light sheets are used, or if the light sensor arrangement defines a sparse set of detection points along the periphery of the touch surface. Thus, this embodiment may enable a relatively low complexity in the optical design of the touch-sensing apparatus, and/or a reduced number of components in either of (or both) the light source arrangement and the light sensor arrangement. Furthermore, the use of Bayesian inversion may result in an advantageous suppression of noise, as will be further explained below. Also, Bayesian inversion enables priors to be used to define desired properties of the estimated attenuation field, i.e. properties that are likely to occur in the attenuation field of a touch-sensing apparatus. Such properties may include that the attenuation field is made up of non-negative values, that the attenuation field underneath a touching object is essentially flat, that there is a sharp decrease in attenuation at the perimeter of each touch, that the perimeter of each touch is elliptical, etc.

In one embodiment, the prior distribution p(a) includes a total variation prior. It has been found that the total variation prior properly represents the probability distribution of attenuation values that occur when objects interact with the touch-sensing apparatus. For example, the total variation prior promotes smooth attenuation fields while allowing for local step changes in attenuation, which typically occur at the perimeter of a touch. The total variation prior may be given as a function of the sum of absolute differences between neighboring attenuation values within the attenuation field.

In one embodiment, the likelihood distribution p(d|a) is modeled to represent measurement noise, i.e. capture the influence of measurement noise. The estimated attenuation field may be derived by finding the most likely attenuation field based on p(a|d), which may involve locating an optimum in p(d|a). This, in turn, might correspond to minimizing, or at least suppressing, measurement noise. The measurement noise may be represented by a Gaussian distribution. This may facilitate the Bayesian inversion, e.g. since it may enable simple computation of gradients.

In one embodiment, measurement noise is calculated as a difference between the output vector d and a predetermined model function $\mathscr{F}(a)$, which represents the aforesaid mapping and provides an estimate of the output vector d given an attenuation vector a. This reduces the task of determining the likelihood distribution p(d|a) to a task of determining the model function $\mathscr{F}(a)$.

In one embodiment, the probability distribution p(a|d) is given by:

$$e^{-\alpha \|\mathcal{P}(a)-d\|_2^2 - \gamma \Sigma_{n \in N} |a-a_n|},$$

with α and γ being constants, $\mathcal{P}(a)$ being the model function, and $\Sigma|a-a_n|$ being the sum of the absolute differences between neighboring attenuation values within the attenuation field.

In one embodiment, the step of calculating the estimated attenuation field comprises finding the attenuation vector a that maximizes the probability distribution p(a|d).

In one embodiment, the method operates to sequentially estimate the attenuation field for a time-sequence of output vectors d, wherein an attenuation vector found for a preceding output vector is used as starting point for the step of finding the attenuation vector for a current output vector. Generally, the step of finding the attenuation vector a that maximizes the probability distribution p(a|d) is a relatively processing-intensive operation, which may involve iterative analysis. Under the assumption that the attenuation field varies only slowly between output vectors, a significant decrease in processing requirement and/or processing time may be obtained by searching for the maximum in p(a|d) based on the estimated attenuation field for a preceding output vector.

In all of the above embodiments, it should be understood that the signal values in the output vector could be the measurement values obtained from the light sensor arrangement, or a derivative thereof. Consequently, the attenuation field need not directly represent the attenuation across the touch surface, but could instead represent the distribution of light energy. In all embodiments, the step of extracting touch data could involve comparing the attenuation field with a reference distribution, wherein changes between a current attenuation field and the reference distribution may be taken to indicate touching objects. The reference distribution may be an estimated attenuation field that was calculated for a preceding output vector, or in a dedicated calibration measurement. Further alternatives for obtaining and using a reference distribution is disclosed in Applicant's U.S. provisional patent application No. 61/272,666, which was filed on Oct. 19, 2009 and which is incorporated herein by reference.

In one embodiment, the step of obtaining the output vector comprises: obtaining measurement values representing received light energy on the set of detection lines, and normalizing the measurement values by a respective background value. The normalization may compensate for variations in nominal energy between different detection lines, thereby improving the accuracy of estimated attenuation field and facilitating the extraction of touch data. The background value may represent the received light energy without objects touching the touch surface, and may be obtained as a factory calibration value or by obtaining the measurement values during operation without objects on the touch surface, e.g. at start-up. Yet further alternatives for obtaining and using background values are disclosed in Applicant's International patent application No. PCT/SE2010/050932, which was filed on Sep. 1, 2010 and which is incorporated herein by reference. The step of normalizing may represent a division of each measurement value by the background value. Thereby, the resulting signal value will represent a true transmission value or attenuation value for the detection line. This may facilitate the reconstruction of the attenuation field, and may also improve the mapping between detection lines and basis functions. Such a mapping may thus be defined under the assumption that the total transmission value of each detection line is given by the product of transmission values for each individual object that touches the detection line. Further, the step of obtaining the output vector may comprise the step of calculating a logarithm of the measurement values. This may simplify the step of calculating the estimated attenuation field since the total transmission value of each detection line may be calculated as a sum of logarithmic transmission values for each individual object that touches the detection line. It should also be realized that the normalization may instead be represented by a subtraction of a (possibly logarithmic) background value.

A second aspect of the invention is a computer program product comprising computer code which, when executed on a data-processing system, is adapted to carry out the method of the first aspect.

A third aspect of the invention is a device for extracting touch data related to one or more objects on a touch surface included in a touch-sensing apparatus. The apparatus comprises a light transmissive panel that defines a touch surface and an opposite surface, a light source arrangement for providing sheets of light inside the panel, wherein said sheets comprise light that propagates by internal reflection between the touch surface and the opposite surface, and a light sensor arrangement for measuring transmitted light energy, wherein the light source arrangement and the light sensor arrangement are arranged to define a grid of detection lines on the touch surface, each detection line representing a light path across the touch surface from the light source arrangement to the light sensor arrangement, and wherein the touch-sensing apparatus is configured such that one or more objects touching the touch surface causes a local attenuation in said grid of detection lines. The device comprises: an element for obtaining an output vector containing signal values indicative of light received by the light sensor arrangement on a set of detection lines; an element for representing a two-dimensional attenuation field on the touch surface by at least one two-dimensional basis function, wherein the or each basis function defines an attenuation strength within its two-dimensional extent; an element for calculating an estimated attenuation field, based on a mapping of said set of detection lines to the or each basis function, by optimizing at least one of the attenuation strength and the location of the or each basis function such that the estimated attenuation field yields the output vector; and an element for processing the estimated attenuation field for extraction of said touch data.

A fourth aspect of the invention is a touch-sensing apparatus, comprising: a light transmissive panel that defines a touch surface and an opposite surface; a light source arrangement for providing sheets of light inside the panel, wherein said sheets comprise light that propagates by internal reflection between the touch surface and the opposite surface; a light sensor arrangement for measuring transmitted light energy, wherein the light source arrangement and the light sensor arrangement are arranged to define a grid of detection lines on the touch surface, each detection line representing a light path across the touch surface from the light source arrangement to the light sensor arrangement, and wherein the touch-sensing apparatus is configured such that one or more objects touching the touch surface causes a local attenuation in said grid of detection lines; and a device for extracting touch data according to the third aspect.

Any one of the embodiments of the first aspect can be combined with the second to fourth aspects.

A fifth aspect of the invention is a method in a touch-sensing apparatus, said method comprising the steps of:

obtaining an output vector d containing signal values indicative of light received by a light sensor arrangement on a set of detection lines; representing a two-dimensional attenuation field on a touch surface by attenuation values contained in an attenuation vector a; estimating the attenuation field by Bayesian inversion based on Bayes' formula: $p(a|d) = \kappa \cdot p(a) \cdot p(d|a)$, wherein $\kappa$ is a constant, $p(a)$ is a prior distribution which represents the probability distribution of the attenuation values independently of the output vector d, $p(d|a)$ is a likelihood distribution which represents the probability distribution of the signal values given the attenuation vector a, and $p(a|d)$ represents the probability distribution of the attenuation values given the output vector d; and processing the estimated attenuation field for extraction of touch data relating to one or more objects touching the touch surface.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 1 is a side view of a touch-sensing apparatus.

FIG. 2A is a top plan view of a scan beam embodiment of the touch-sensing apparatus in FIG. 1, FIG. 2B illustrates a projection signal generated in the scan beam embodiment, and FIG. 2C is a top plan view of another scan beam embodiment.

FIG. 3A is a top plan view of a fan beam embodiment of the touch-sensing apparatus in FIG. 1, and FIG. 3B is a top plan view of another fan beam embodiment.

FIG. 4 is a side view of a touch panel to illustrate a propagating beam.

FIG. 11 is a top plan view of a scan beam embodiment to illustrate signal broadening caused by scanning.

FIGS. 12A-12B are graphs of dispersion functions caused by scattering in a touch-sensing apparatus.

FIG. 14 illustrates a set of different correction kernels.

FIGS. 15A-15B illustrate the results of convolving the projection kernel in FIG. 10A and FIG. 10B, respectively, with each of the correction kernels in FIG. 14.

DETAILED DESCRIPTION OF EXAMPLE EMBODIMENTS

Figure 5A:
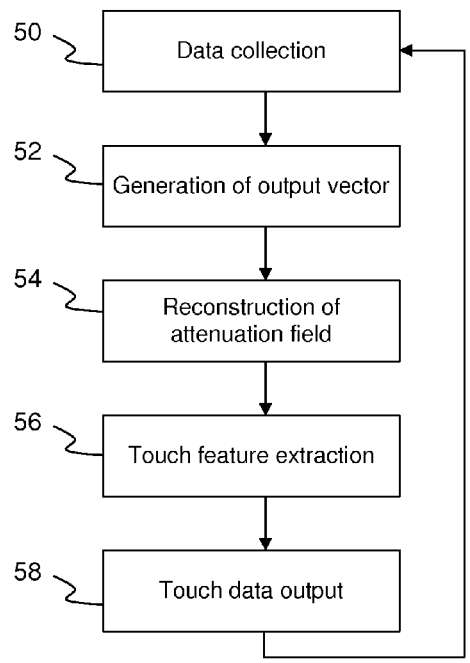
FIG. 5A is a flow chart of an embodiment of a touch data extraction method.

The present invention relates to techniques for extracting touch data for at least one object, and typically multiple objects, in contact with a touch surface of a touch-sensing apparatus. The description starts out by presenting the use of frustrated total internal reflection (FTIR) for touch determination, in relation to a number of exemplifying arrangements for illuminating the interior of a light transmissive panel. Then, a method for touch determination is described and certain steps of the method are discussed in further detail.

Throughout the description, the same reference numerals are used to identify corresponding elements.

The following notation is used for identifying certain signals, signal parameters/representations, and model parameters/representations.

$S_i$: projection signal i
$P_{i,n}$: peak n in projection signal i
$D_j$: detection line j on touch surface
$T_j$: signal transmission on detection line j
d: output vector derived based on light sensor readings
$d_m$: signal value m in output vector d
a: attenuation vector representing the attenuation field on the touch surface
$f_v$: basis function arranged in grid point v in attenuation field
$a_v$: attenuation value at grid point v in attenuation field
$k_v$: projection kernel for basis function $f_v$,
$m_v$: compensation kernel for basis function $f_v$,
$r_{v,j}$: projection kernel coefficient for basis function $f_v$ and detection line j 1. Illumination and Detection FIG. 1 is a side view of an exemplifying arrangement in a touch-sensing apparatus. The arrangement includes a light transmissive panel 1, one or more light emitters 2 (one shown) and one or more light sensors 3 (one shown). The panel defines two opposite and generally parallel surfaces 4, 5 and may be planar or curved. In FIG. 1, the panel 1 is rectangular, but it could have any extent (polygonal, circular, elliptical, etc). A radiation propagation channel is provided between two boundary surfaces of the panel, wherein at least one of the boundary surfaces allows the propagating light to interact with a touching object 6. Typically, the light from the emitter(s) 2 propagates by total internal reflection (TIR) in the radiation propagation channel, and the sensors 3 are arranged at the periphery of the panel 1 to generate a respective output signal which is indicative of the energy of received light.

As shown in FIG. 1, the light may be coupled into and out of the panel 1 directly via the edge portion that connects the top and bottom surfaces 4, 5 of the panel 1. Alternatively, a separate coupling element (e.g. in the shape of a wedge) may be attached to the edge portion or to the top or bottom surface 4, 5 of the panel 1 to couple the light into and/or out of the panel 1. When the object 6 is brought sufficiently close to the boundary surface, part of the light may be scattered by the object 6, part of the light may be absorbed by the object 6, and part of the light may continue to propagate unaffected. Thus, when the object 6 touches a boundary surface of the panel (e.g. the top surface 4), the total internal reflection is frustrated and the energy of the transmitted light is decreased. This type of touch-sensing apparatus is denoted "FTIR system" (FTIR—Frustrated Total Internal Reflection) in the following.

The location of the touching object 6 may be determined by measuring the energy of the light transmitted through the panel 1 on a plurality of detection lines. This may, e.g., be done by operating a number of spaced-apart emitters 2 to generate a corresponding number of light sheets inside the panel 1, and by operating the sensors 3 to detect the energy of the transmitted energy of each light sheet. The operating of emitters 2 and sensors 3 may be controlled by a data processing device 7. In the embodiment of FIG. 1A, the device 7 is configured to process the measurement signal(s) from the sensor(s) 3 to extract data related to the touching object 6, including its location.

FIGS. 2A-2C illustrates an embodiment of an FTIR system, in which each light sheet is generated by sweeping a beam of light across the touch surface inside the panel. This type of embodiment is also denoted "scan beam embodiment" in the following.

In the embodiment of FIG. 2A, two beams B1, B2 are swept across the panel in two different directions R1, R2, and the energy of each transmitted beam is measured during the sweep. Typically, each beam B1, B2 is collimated in the plane of the panel 1. The sweeping of a collimated beam B1, B2 forms a sheet of light. Specifically, each beam B1, B2 is generated and swept along a set of entry or incoupling points within an incoupling site 10 on the panel 1 by an input scanner arrangement 8. The transmitted energy at a number of outcoupling points within an outcoupling site 11 on the panel 1 is measured by a detection arrangement 9 which is synchronized with the input scanner arrangement 8 to receive the beam B1, B2 as it is swept across the panel 1.

Each input scanner arrangement 8 typically includes a light emitter and a beam scanner (not shown). However, it is conceivable that two or more input scanner arrangements share one and the same light emitter. Typically, the beams are translated across the panel, i.e. they have an essentially invariant angle (scan angle) in the plane of the panel. Although not shown in FIG. 2A, dedicated optical components are associated with the incoupling and outcoupling sites 10, 11 to re-direct the incoming light from input scanner arrangement 8 into a desired direction ("scan angle") and to re-direct the transmitted light towards a common focal area/point on the light sensor arrangement 9, respectively.

The detection arrangement 9 may be configured in many different ways. In one variant (not shown), each detection arrangement 9 includes a beam scanner and one light sensor, where the beam scanner is arranged in the common focal area/point and controlled to direct the transmitted beam towards the light sensor during the sweep. In a variant (not shown), the beam scanner is omitted and a single light sensor is arranged in the aforesaid common focal area/point. In this variant, the stationary radiation detector is controlled to measure the received energy as a function of time, while a beam is swept along an incoupling site on the panel. In another variant (not shown), each detection arrangement 9 (and the redirecting optical components) is replaced by a respective elongate sensor, which extends along the panel edge and is optically connected to the panel. Each such elongate sensor is controlled to measure the received energy as a function of time, while a beam is swept along an incoupling site on the panel. In a further variant (not shown), the detection arrangements 9 are omitted and replaced by retro-reflectors, such that the beams B1, B2 are reflected back to the respective input scanner arrangement 8. Thus, the input scanner arrangements 8 are configured as transceivers that both sweep and receive a beam, to measure the transmitted energy.

In scan beam embodiments as disclosed herein, one measurement signal is obtained for each beam sweep, wherein the measurement signal comprises a sequence of energy values that are measured while a specific beam is swept along the outcoupling points in the system (typically within a single outcoupling site). Thus, the measurement signal forms a projection signal, which represents the spatial distribution of light from a light sheet along a border portion of the touch surface. To exemplify this aspect further, FIG. 2B illustrates a measurement signal $S_1$ obtained from the right-end detection arrangement 9 in FIG. 2A. FIG. 2B also schematically illustrates the corresponding set of detection lines $D_1, \ldots, D_N$ for the light beam B1 while it is swept across the panel 1, where the density of detection lines is arbitrary and depends, i.a., on the sampling rate of the detection arrangement 9. The measurement signal $S_1$ could, e.g., be given as a function of time, which is equivalent to location along the right-end edge of the panel 1. The measurement signal $S_1$ is illustrated to contain a signal profile $P_{1,1}$ that originates from a touching object (not shown). Generally, such a signal profile $P_{1,1}$ is also denoted "touch signature" in the following.

It is to be understood that any number of beams can be swept across the touch surface. FIG. 2C illustrates a scan beam embodiment in which six beams B1-B6 are swept across the touch surface, thereby generating six light sheets within the panel. FIG. 2C is a plan view of the panel and illustrates the interaction between all center rays of all beams with the outer boundaries of four touching objects 6 on the touch surface. In FIG. 2C, a first set of beams B1, B3, B4 are injected for propagation from a first incoupling site 10 to a first outcoupling site 11 while being swept in a first main direction R1, and a second set of beams B2, B5, B6 are injected for propagation from a second incoupling site 10 to a second outcoupling site 11 while being swept in a second main direction R2. The first and second main directions R1, R2 are mutually orthogonal and parallel to the edges of the panel. The first set of beams includes one beam B1 that is perpendicular to the first incoupling site, and two beams B3, B4 with different scan angles. The second set of beams includes one beam B2 that is perpendicular to the second incoupling site, and two beams B5, B6 with different scan angles. The transmitted energy of each beam is measured by a detection arrangement (not shown), resulting in six measurement signals $S_1$-$S_6$.

FIGS. 3A-3B illustrate an embodiment of an FTIR system, in which each light sheet is generated by a respective emitter 2 at the periphery of the panel 1. Each emitter 2 generates a beam of light that expands in the plane of the panel 1 while propagating away from the emitter 2. Such a beam is denoted fan beam, and this type of embodiment is generally referred to as a "fan beam embodiment" in the following. Each fan beam propagates from one or more entry or incoupling points within an incoupling site on the panel 1. Arrays of light sensors 3 are located around the perimeter of the panel 1 to receive the light from the emitters 2 at a number of spaced-apart outcoupling points within an outcoupling site on the panel 1. As indicated by dashed lines in FIG. 3A, each emitter-sensor pair defines a detection line. Thus, the data processing device 7 samples one measurement value for each detection line from the array of sensors 3. It is to be understood that, if needed, the ensemble of measurement values could be rearranged by the data processing device 7 to form projection signals (cf. FIG. 2B) that represent the spatial distribution of light from each fan beam along a respective border portion of the touch surface. FIG. 3B illustrates a fan beam embodiment with a larger number of emitters (indicated by semicircles) and sensors (indicated by squares). FIG. 3B is a plan view of the panel and illustrates all detection lines that are affected by a touching object.

2. Transmission

As indicated in FIG. 1, the light will not be blocked by the touching object 6. Thus, if two objects happen to be placed after each other along a light path from an emitter 2 to a sensor 3, part of the light will interact with both objects. Provided that the light energy is sufficient, a remainder of the light will reach the sensor 3 and generate an output signal that allows both interactions (touch points) to be identified. Thus, in multi-touch FTIR systems, the transmitted light may carry information about a plurality of touches.

In the following, $T_j$ is the transmission for the j:th detection line, $T_v$ is the transmission at a specific position along the detection line, and $a_v$ is the relative attenuation at the same point. The total transmission (modeled) along a detection line is thus:

$$T_j = \prod_v T_v = \prod_v (1 - a_v)$$

The above equation is suitable for analyzing the attenuation caused by discrete objects on the touch surface, when the points are fairly large and separated by a distance. However, if the system is considered to be completely multiplicative, a more correct definition of attenuation through an attenuating medium may be used:

$$I_j = I_{0,j} \cdot e^{-\int a(x)dx} \rightarrow T_j = I_j/I_{0,j} = e^{-\int a(x)dx}$$

In this formulation, $I_j$ represents the transmitted energy on detection line $D_j$ with attenuating object(s), $I_{0,j}$ represents the transmitted energy on detection line $D_j$ without attenuating objects, and $a(x)$ is the relative attenuation along the detection line $D_j$. We also let the detection line interact with the touch surface along the entire extent of the detection line, i.e. the detection line is represented as a mathematical line. This is a fair assumption for any FTIR system as shown in FIG. 4, in which the distance $\Delta_B$ between two bounces in the touch surface is smaller than the size $\Delta_T$ of the touching objects. The assumption may yield acceptable results also in FTIR systems with $\Delta_B \geq \Delta_T$.

To facilitate the touch data extraction process as described in the following, the measurement values are divided by a respective background value. By proper choice of background values, the measurement values are converted into transmission values, which thus represent the fraction of the available light energy that has been measured on each of the detection lines. It may also be beneficial to convert the transmission values into logarithmic values (in any base), since the logarithm of the total transmission along a detection line is then equal to the sum of the logarithms of the individual transmissions $T_v$ at discrete positions on that detection line:

$$\log(T_j) = \log(\pi T_v) = \Sigma \log(T_v)$$

3. Touch Data Extraction

FIG. 5 illustrates an embodiment of a method for touch data extraction in an FTIR system. The method involves a sequence of steps 50-58 that are repeatedly executed, typically by the data processing device 7 (FIGS. 1-3). In the context of this description, each sequence of steps 50-58 is denoted a sensing instance.

Each sensing instance starts by a data collection step 50, in which measurement values are sampled from the light sensors in the FTIR system. The data collection results in one measurement value for each detection line. It may be noted that the data may, but need not be, collected for all available detection lines in the FTIR system.

In a processing step 52, the measurement values are pre-processed, e.g. by filtering for noise reduction, conversion into transmission values (or equivalently, attenuation values), conversion into logarithmic values, etc. The pre-processing step 52 also involves arranging the possibly pre-processed measurement values in an output vector d. The output vector is thus made up of an ordered set of signal values $d_m$, each of which corresponds to a specific detection line and is generated based on the corresponding measurement value.

In a reconstruction step 54, the output vector d is processed to obtain the most likely distribution of attenuation values ("the attenuation field") across the touch surface. Step 54 utilizes a predetermined mathematical formula that relates the attenuation field to the output vector d. The attenuation field is expressed in terms of a set of basis functions, such that the predetermined mathematical formula can be generated based on a model that describes the attenuation of each detection line caused by the interaction between the detection line and the set of basis functions. In other words, the model describes how a touching object would affect the detection lines of the FTIR system. In one embodiment to be further described in the next sections, the model is used in a statistical reconstruction algorithm, based on Bayesian inversion, to obtain a probability distribution of the attenuation values as a function of the output vector d. In such an embodiment, the reconstruction step 54 may process the probability distribution to find a "likely" attenuation field in view of the output vector d.

Finding a likely attenuation field may involve obtaining the maximum a posteriori (MAP) estimate for the attenuation field. This, and other ways of identifying the likely attenuation field, is an optimization/minimization problem that can be solved using any known numerical or analytical algorithm, such as pseudo-inverse, steepest descent, conjugant gradient, Newton-Raphson, quasi-Newton, etc. These and other useful algorithms are further described in, e.g., the book "Numerical Recipes", $3^{rd}$ edition, by Press et al. Another useful variant of the steepest descent algorithm is described in the article "Two-Point Step Size Gradient Methods" by Barzilai and Borwein in IMA Journal of Numerical Analysis 1988 8(1): 141-148.

Many optimization/minimization algorithms are iterative. One way of reducing the number of iterations would be to use the reconstructed attenuation field from a preceding sensing instance as the starting point for the optimization/minimization in step 54.

Figure 6A:
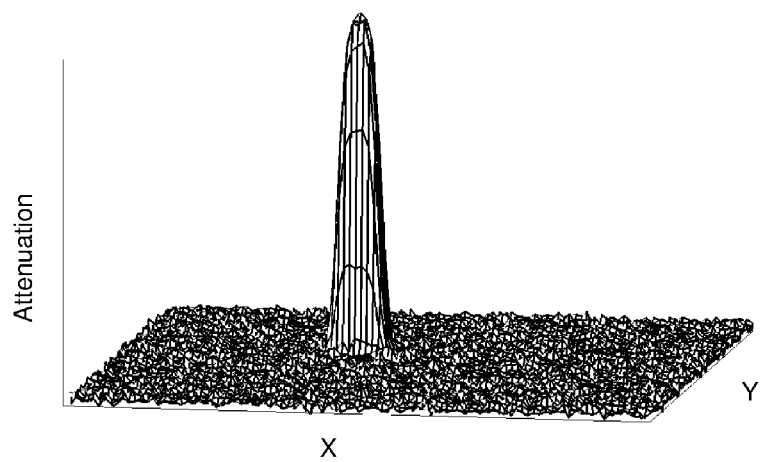
FIG. 6A-6C are 3D plots of estimated attenuation fields.
Figure 6B:
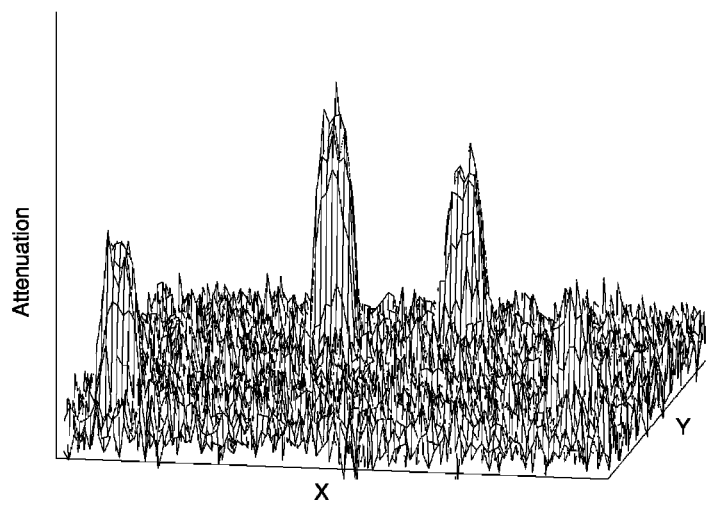

An example of a reconstructed attenuation field is given in the 3D plot of FIG. 6A, which shows reconstructed attenuation values in the XY coordinate system of the touch surface. In this example, a peak in the attenuation field is caused by a single object in contact with the touch surface. FIG. 6B illustrates the reconstructed attenuation field with four objects in contact with the touch surface. It is seen that each object results in a peak in the attenuation field.

Figure 6C:
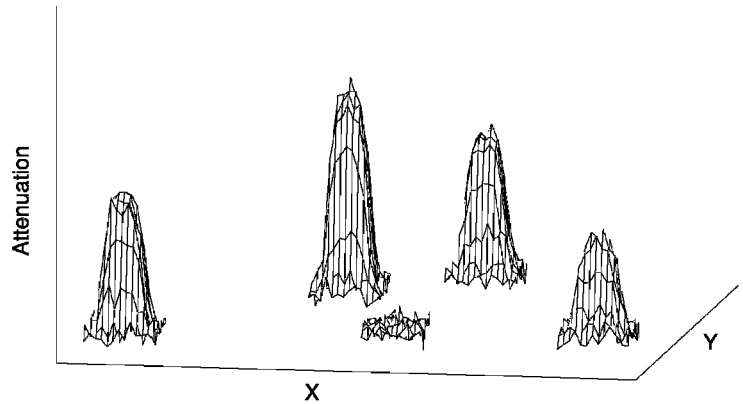

Thus, FIGS. 6A-6B are examples of full reconstructions of the attenuation field, i.e. estimations of all attenuation values within the extent of the touch surface. In an alternative embodiment, the attenuation field is only reconstructed within one or more subareas of the touch surface. The subareas may be identified by analyzing intersections of attenuation paths across the touch surface, based on the above-mentioned projection signals. A technique for identifying such subareas is further disclosed in Applicant's U.S. provisional patent application No. 61/272,665, which was filed on Oct. 19, 2009 and which is incorporated herein by reference. FIG. 6C illustrates the result of such a localized reconstruction within five subareas based on the same output vector as the full reconstruction in FIG. 6B. Again, four peaks originating from the touching objects are seen in the attenuation field.

In extraction step 56, the reconstructed attenuation field is then processed for identification of touch-related features and extraction of touch data. Any known technique may be used for isolating true (actual) touch points within the attenuation field. For example, ordinary blob detection and tracking techniques may be used for finding the actual touch points. In one embodiment, a threshold is first applied to the attenuation field, to remove noise. Any areas with attenuation values that exceed the threshold, may be further processed to find the center and shape by fitting for instance a two-dimensional second-order polynomial or a Gaussian bell shape to the attenuation values, or by finding the ellipse of inertia of the attenuation values. There are also numerous other techniques as is well known in the art, such as clustering algorithms, edge detection algorithms, etc.

Any available touch data may be extracted, including but not limited to x,y coordinates, areas, shapes and/or pressure of the touch points.

In step 58, the extracted touch data is output, and the process returns to the data collection step 50.

It is to be understood that one or more of steps 50-58 may be effected concurrently. For example, the data collection step 50 of a subsequent sensing instance may be initiated concurrently with any of steps 52-58.

Figure 5B:
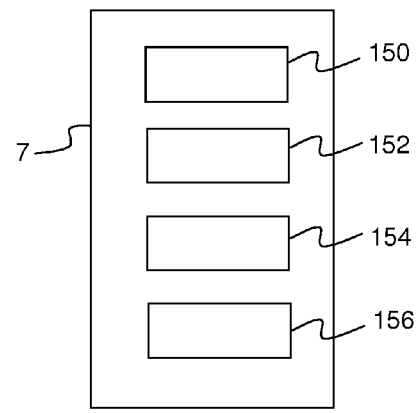
FIG. 5B is a block diagram of an embodiment of a touch data extraction device.

The touch data extraction process is typically executed by a data processing device (cf. 7 in FIG. 1 and FIG. 3A) which is connected to sample the measurement values from the light sensor arrangement in the FTIR system. FIG. 5B shows an example of such a data processing device 7 for executing the process in FIG. 5A. In the illustrated example, the device 7 includes an element (or means) 150 for obtaining the output vector d. The device 7 further includes an element (or means) 152 for representing a two-dimensional attenuation field on the touch surface by one or more two-dimensional basis functions, with each basis function defining an attenuation strength within its two-dimensional extent. There is also provided an element (or means) 154 for calculating an estimated attenuation field, based on a mapping of the set of detection lines to each basis function, by optimizing at least one of the attenuation strength and the location of each basis function such that the estimated attenuation field yields the output vector d. The device 7 further includes an element (or means) 156 for processing the estimated attenuation field for extraction of touch data.

The device 7 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The computing device may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The computing device may include one or more communication interfaces, such as a serial interface, a parallel interface, a USB interface, a wireless interface, a network adapter, etc, as well as one or more data acquisition devices, such as an A/D converter. The special-purpose software may be provided to the computing device on any suitable computer-readable medium, including a record medium, a read-only memory, or an electrical carrier signal.

4. Modeling of an FTIR System

As explained above, the reconstruction step 54 is based on an interaction model for the specific FTIR system. Throughout this section, the design of such a model will be explained in relation to the above-identified scan beam and fan beam embodiments. This invention is, however, not limited to these two geometries but can be used for any design of the FTIR system.

The interaction model may be designed once for every FTIR system, i.e. as part of a calibration step at manufacture. However, it may also be designed as part of a re-calibration procedure any time after manufacture, e.g. to account for that fact that the alignment of optics and mechanics may change over time.

4.1 Attenuation Field

To accurately model the attenuation of one or more touches on the touch surface, a suitable representation of the attenuation field needs to be chosen. This can be done in several different ways. In the following, the notion of basis functions is used to represent the attenuation field. There is a wide variety of basis functions that may be used for this purpose. A few examples are listed below.

In the following example, the attenuation field is represented by a distribution of partially overlapping basis functions across the touch surface (or rather in the coordinate system of the touch surface). For modeling the attenuation field, a position and an attenuation parameter is assigned to each basis function.

4.1.1 Reconstruction Grid

Figure 7A:
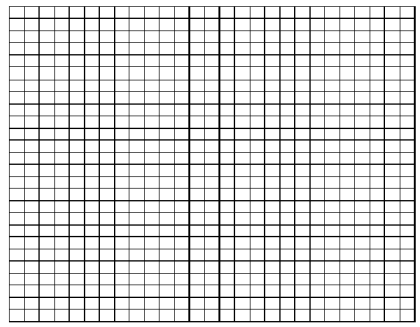
FIGS. 7A-7B are plan views of a rectangular reconstruction grid and a triangular reconstruction grid, respectively.
Figure 7B:
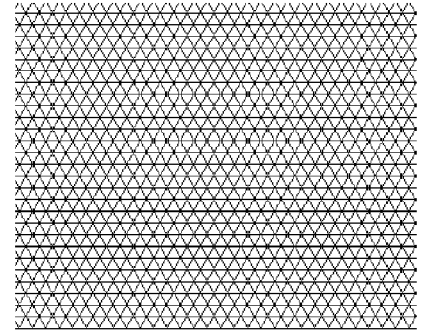

The basis functions may all be similar in shape and may be fixed in position in a reconstruction grid on the touch surface. In the following, it is assumed that there is one basis function at each grid point or vertex in the reconstruction grid. The grid can for instance be a rectangular grid or a triangular grid. FIG. 7A illustrates a rectangular grid superimposed on a touch surface. Such a grid corresponds to an ordinary representation of a computerized image, i.e. essentially a matrix of rectangular or square pixels. FIG. 7B is a corresponding view of a triangular grid, which is a contiguous mesh of triangular elements. In the illustrated examples, each reconstruction grid defines a regular set of grid points (also denoted vertices) at the grid line intersections.

The following description will focus on the use of a triangular grid, since it has been found to enable a better representation of the step change in attenuation at the border of an elliptical touch object than by using a rectangular grid. Further, all examples will be given for a triangular grid made up of equilateral triangles (also denoted "regular hexagonal grid"). The definitions of neighborhood structures for the basis functions may become easy when we use a regular hexagonal grid since there are 6 neighbors at the same distance from each grid point. This aspect may be useful e.g. in the construction of priors based on neighboring grid points.

4.1.2 Basis Function and Interpolation Order

As shown above, each detected transmission value may be at least approximately derived from the integral of the attenuation along the respective detection line. In order to be able to represent and reconstruct the attenuation field, it is mapped from a real world $R^2$ domain onto a $Z^2$ domain, so as to reduce the dimensionality. This may be important in order to get a stable reconstruction of the attenuation field. In this mapping, we want to mimic the real world attenuation as good as possible whilst maintaining a sensible amount of processing in the reconstruction step.

In order to find out how the basis functions interact with the detection lines in the FTIR system, we also need to choose an interpolation order for the basis functions. By proper design and arrangement of the basis functions for representing the attenuation field, it is possible to efficiently produce interpolation of the reconstructed attenuation field without too much processing during the reconstruction step. Below follows a list of different interpolation orders:

Zero-order interpolation: every basis function has the same attenuation over its whole area, i.e. the basis function is a top-hat function.

Linear or first-order interpolation: the attenuation of a specific basis function decreases linearly to zero with increasing distance from the center of the basis function. When attenuation of the neighboring basis functions are added together (weighted with distance from detection line to their centers), a linear interpolation of the attenuation field is obtained.

Higher-order interpolation: using higher order interpolation will give even smoother interpolation. However, the basis functions will overlap more and the reconstruction step will need more processing. In one example, the basis functions are spline functions.

Moving up from zero-order to first-order interpolation results in a significant improvement in the ability of the model to mimic a true continuous attenuation field. This improvement is also gained by little extra computational cost. Also, by using interpolating basis functions, a sparser reconstruction grid can be used to attain a given accuracy in the reconstruction, compared to top-hat basis functions.

4.1.3 Example of Linear Interpolation

As will be shown, a hexagonal grid enables the use of basis functions shaped as a pyramid with a hexagonal base, with the center point of the base coinciding with a grid point, and the corner points of the base coinciding with the neighboring grid points. By placing one basis function at each grid point, we obtain a triangle mesh with enforced continuity at the triangle corners and edges.

Figure 8A:
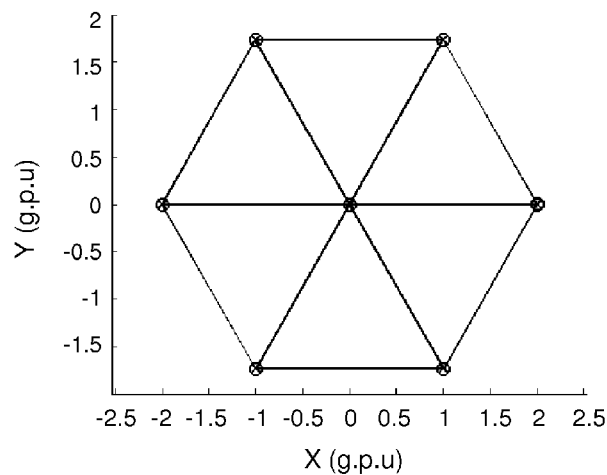
FIGS. 8A-8B are top plan and perspective views, respectively, of a basis function.
Figure 8B:
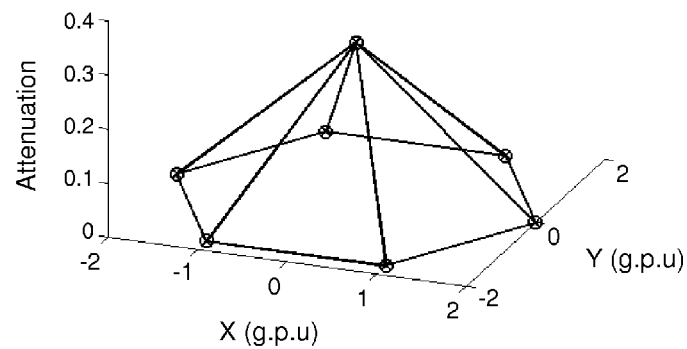

FIGS. 8A-8D further illustrate the use of basis functions to achieve linear interpolation. In this illustrated example, the distance between grid points (denoted a "grid point unit", g.p.u.) and thus neighboring basis functions, is 2 mm. FIG. 8A is a plan view of one basis function in a hexagonal grid pattern, and FIG. 8B is a perspective view of the basis function.

Figure 8C:
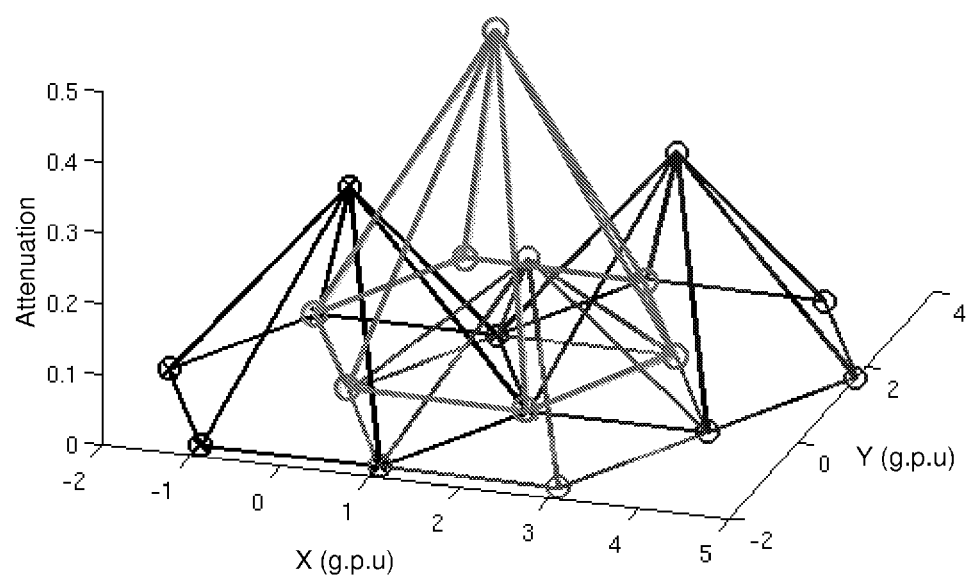
FIG. 8C is a perspective view of a set of neighboring basis functions.
Figure 8D:
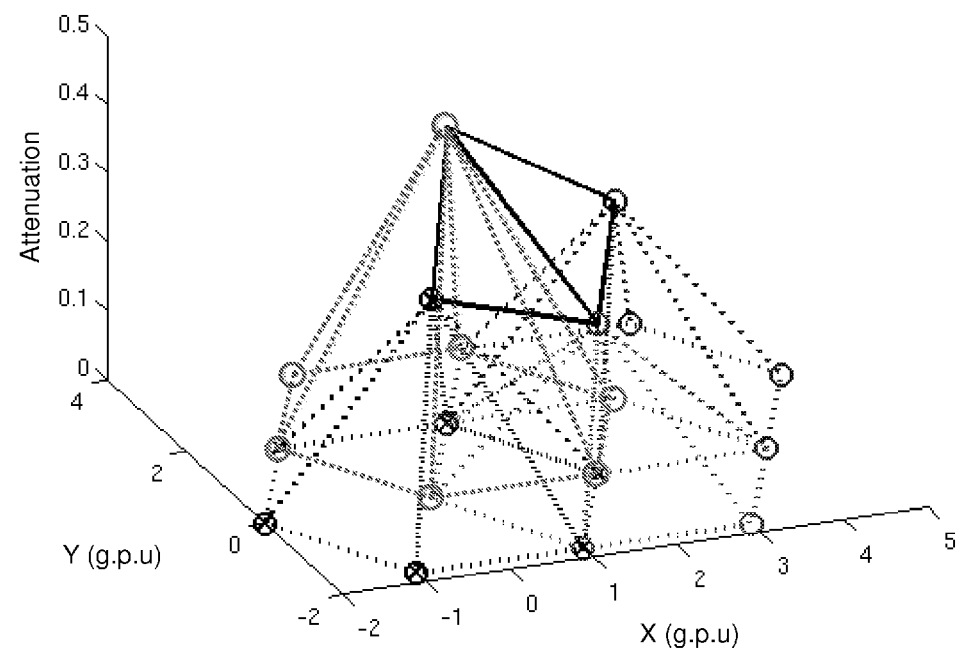
FIG. 8D is a perspective view to illustrate an attenuation field represented by the basis functions in FIG. 8D.

To achieve a proper representation of the attenuation field, each basis function is assigned its own specific attenuation. This essentially means that each basis function is a pyramid with an individual height. FIG. 8C illustrates the basis function in FIG. 8A and three of its neighboring basis functions, each with an individual height. FIG. 8D illustrates the result of adding together the overlapping contributions of the individual basis functions (dotted lines), so as produce a linear interpolation within the reconstruction grid. Thus, three overlapping basis functions jointly define an interpolated attenuation field within each of the two top triangles (full lines).

From FIG. 8, it should also be realized that a hexagonal grid might be good at approximating round edges in the attenuation field. Generally, arranging any type of basis functions in a hexagonal grid may facilitate the task of accurately representing the shape of a touch, which in general will be an ellipse-like structure in the attenuation field.

4.1.4 Interaction Model for a Single Basis Function

When the representation of the attenuation field is set, it is possible to analyze how each basis function interacts with each detection line. For reconstruction purposes, we need to know the total line integral through the attenuation field for each detection line. The total line integral will thus be the sum (or other appropriate aggregation function depending on transmission model) of the line integral for all basis functions that intersect with the detection line.

As used herein, a "line integral" denotes a function that is evaluated to generate a measure of the area of a slice through the basis function, where the slice may be formed by the intersection between the detection line and the basis function. This line integral may be generated as an analytic integration of the slice, or an approximation thereof. Such an approximation may involve calculating the area based on a plurality of data points that define the slice, typically at least 3 data points. Each such data point defines a value of the basis function at a specific location within the basis function.

Since the basis functions and the detection lines have a known extent, it is possible to pre-compute the line integral for a specific detection line and a specific basis function. FIGS. 9-10 serve to further illustrate the computation of such line integrals, for basis functions in the form of hexagonal pyramids. In FIGS. 9-10 distance is given in grid point units.

Thus, it is conceivable to pre-compute, for each detection line, the line integrals for all basis functions that intersect with each detection line. A specific embodiment, to be described in the following, is designed to use so-called "projection kernels", e.g. to enable a memory and processing efficient handling of line integrals during the touch data extraction process (FIG. 5).

Figure 9A:
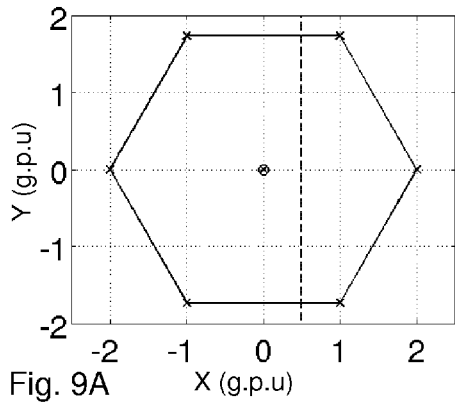
FIGS. 9A-9C are top plan views to illustrate example intersections between a detection line and a basis function.
Figure 10A:
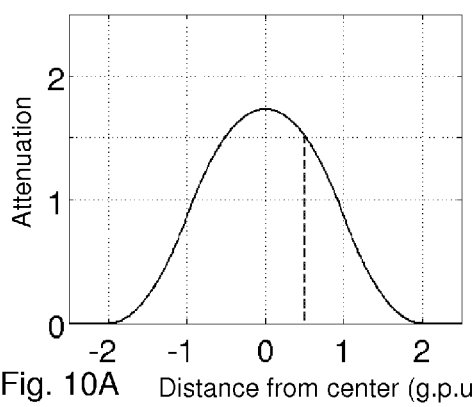
FIGS. 10A-10C illustrate projection kernels corresponding to the intersections in FIGS. 9A-9C.

FIG. 9A is a plan view of a basis function and a detection line that intersects the basis function at a distance of 0.5 grid points from its center. FIG. 10A illustrates the resulting line integral, given as a function of distance between the detection line and the center of the basis function, assuming that the angle of the detection line is the same at each distance. Henceforth, such a line integral function is denoted a "projection kernel" for the basis function. The dashed line in FIG. 10A indicates the line integral value for the detection line shown in FIG. 9A. In the following, this value is also denoted the "projection kernel coefficient" for the detection line.

Basically, a projection kernel may be regarded as a representation of the interaction between the basis function and a particular light sheet. For example, the projection kernel in FIG. 10A could represent the interaction between the basis function and the light sheet generated by the beam B2 in FIG. 2C.

Figure 9B:
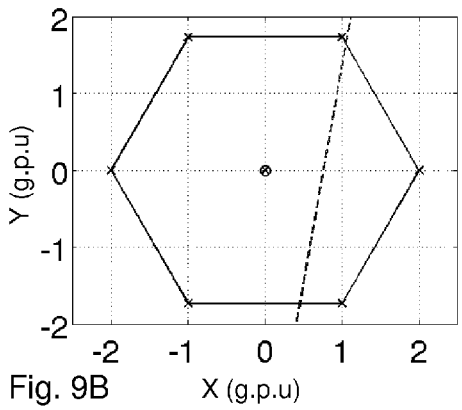
Figure 10B:
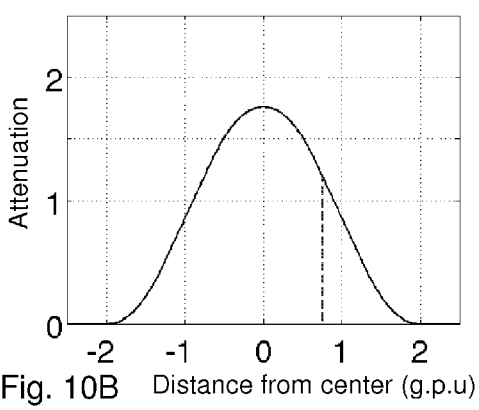

FIG. 9B corresponds to FIG. 9A, but illustrates a detection line that is tilted by 10 degrees. FIG. 10B illustrates the corresponding projection kernel, which could represent the interaction between the basis function and the light sheet generated by the beam B5 in FIG. 2C.

Figure 9C:
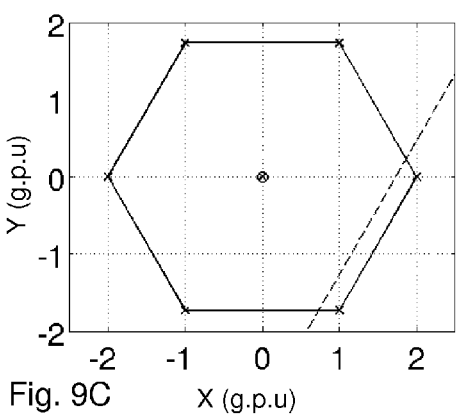
Figure 10C:
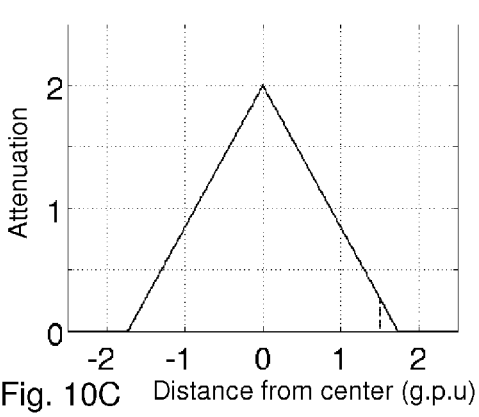

FIG. 9C corresponds to FIG. 9A, but illustrates a detection line that is tilted by 30 degrees. FIG. 10C illustrates a corresponding projection kernel.

In this example, with invariant "scan angle" of the detection line, the line integral for one detection line through one basis function depends on two variables only: the shortest distance from the center of the basis function to the detection line, and the angle between the detection line and the orientation of the basis function.

Since the geometry of the FTIR system is known, it is possible to determine the distance and orientation between each detection line and each basis function. Thus, for every basis function, its interaction with all detection lines can be computed and the resulting line integral value stored along with the position of the basis function. It is important to note that the attenuating effect of a single basis function on the transmission of a single detection line is the product of the line integral and the attenuation parameter that is assigned to the basis function. Thus, in principle, such a calculation results in a model for relating the attenuation field to the output vector.

4.1.5 Compensation for Non-Ideal Detection Lines

Although it is possible to obtain a model for the attenuation field by evaluating the interaction between basis functions and detection lines, it should be understood that such an evaluation need not be based on the simplified assumption that the detection lines have no "width". In practice, each detection line has a finite width. Such a width is, inter alia, caused by the fact that each outcoupling point has a certain extent, e.g. due to the extent of the light-sensing surface of the sensor and/or the field of view of the detection arrangement. The width may also be caused by the fact that the light source/incoupling point may have a certain extent. This applies to both scan beam and fan beam embodiments.

The broadening of detection lines will now be exemplified with respect to the scan beam embodiment in FIG. 11, in which the light sheets are formed by scanning beams (only one beam shown) that have a certain extent in the plane of the panel. FIG. 11 shows a wide beam B1 during its interaction with an object 6. FIG. 11 also shows the resulting projection signal $S_1$, as well the projection signal $S_1'$ obtained if the width of the beam B1 is infinitely small, or at least significantly smaller than the width of the object 6. As shown, the touch signature $P_{1,1}$ is broadened in proportion to the width and intensity profile of the beam B1, since the beam B1 interacts with the object 6 over a distance given by the sum of the widths of the object 6 and the beam B1. It can be shown that a signal value in the projection signal $S_1$ corresponds to (i.e. is generated along) a detection line having a width equal to the width of the beam B1. In FIG. 11, this correspondence is indicated by the dashed lines that extend from the signal value $d_m$ to the beam B1.

It is also to be understood that the beam has an specific intensity profile in the plane of the touch surface, and that this intensity profile also may result in a corresponding intensity profile of the detection lines. The intensity profile may be, e.g., a top hat distribution, a Gaussian distribution, etc.

Thus, it is conceivable to account for the width and/or the intensity profile of the detection lines in the model for the attenuation field, e.g. via the interaction model for a single basis function.

The present applicant has also realized that light scattering within the panel may have an impact on the detection lines, and that this phenomenon may be accounted for in the model.

Such light scattering may be caused by a diffusing surface structure, also called an anti-glare (AG) structure, on the touch surface 4 and/or the opposite surface 5. An AG structure may be used to reduce glares from external lighting on the touch surface. Further, when the touching object is a naked finger, the contact between the finger and the touch surface normally leaves a fingerprint on the touch surface. On a perfectly flat surface, such fingerprints are clearly visible and usually unwanted. By adding an AG structure to the touch surface, the visibility of fingerprints is reduced. Furthermore, the friction between the finger and the touch surface decreases when an AG structure is used, which may thus improve the user experience. AG structures are specified in gloss units (GU), where lower GU values result in less glares.

When a beam of light propagates by internal reflection in a light transmissive panel that has an AG structure on one or both of its boundary surfaces, each internal reflection against such a scattering boundary surface will cause some light to be diverted away from the main direction of the beam and may also cause radiation to escape through the boundary surface.

Light scattering may have other causes, e.g. other types of coatings, layers or surface structures on the light transmissive panel, defects or imperfections in the panel or in the associated optical components, contaminations (fingerprints, dust, etc) on the boundary surfaces of the panel, diffractive effects within the touch-sensing apparatus, etc.

Irrespective of origin, the present Applicant has found that light scattering generally causes the beam to be broadened in the plane of the panel as the beam propagates from its entry point(s) on the panel.

This broadening causes the shape of the touch signature in the projection signal to depend on the location of the touching object on the panel, specifically the distance between the touching object and the relevant incoupling/entry point. FIG. 12A illustrates an exemplifying dependence between the width of the touch signature caused by a touching object and the distance between the touching object and the entry point, for a small width of the beam. The factual width of the touching object is W. When the touching object is located close to the entry point, the detected touch signature will be relatively distinct and have a width similar to the factual width. As the touching object is moved away from the entry point, the detected touch signature will gradually broaden. Close to the outcoupling point, the width of the touch signature may again become slightly smaller. It is to be understood that the actual functional dependence between width and touch location is greatly dependent on the actual optical design of the FTIR system, and that FIG. 12A is merely given as an example. For example, if the width of the beam is increased (e.g. as shown in FIG. 11), the detected touch signature will deviate more from the factual width.

In FIG. 12A, it can be seen that a small touching object located centrally between the entry and outcoupling points will yield the same touch signature width as a larger touching object located closer to the entry point. Based on the type of data shown in FIG. 12A, it is possible to determine the factual width of a touching object that yields a certain touch signature width, as a function of the distance between the touching object and the entry point (or equivalently, the outcoupling point). This type of functional dependence is denoted dispersion function in the following. FIG. 12B is a graph of a dispersion function determined for the data in FIG. 12A. Thus, FIG. 12B illustrates the factual object width at different locations that will generate the same touch signature width in the projection signal. The dispersion function can be obtained by either theoretical calculations for a specific FTIR system or by measurements. Such a dispersion function can be used to improve the touch data extraction process.

But first, we will illustrate the impact of the dispersion on the detection lines in a scan beam embodiment and a fan beam embodiment, respectively.

Figure 13A:
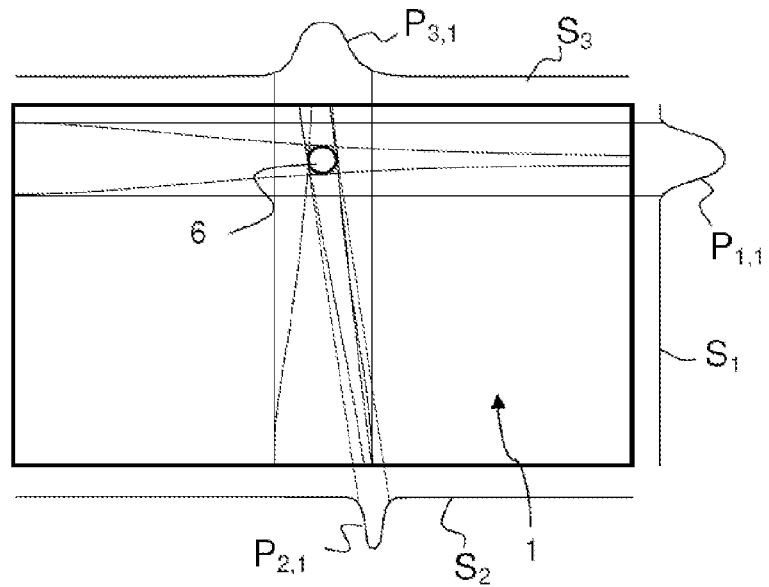
FIGS. 13A and 13B are top plan views of a scan beam embodiment and a fan beam embodiment, respectively, to illustrate how detection lines are influence by scattering.

FIG. 13A is a plan view of a scan beam embodiment, in which three collimated non-parallel beams are swept (translated) across the panel, resulting in three projection signals $S_1$-$S_3$. Each spatial transmission signal $S_1$-$S_3$ contains a respective touch signature $P_{1,1}$, $P_{2,1}$, $P_{3,1}$, resulting from the touching object 6. FIG. 13A illustrates a pair of uncorrected detection lines (straight parallel lines) for each touch signature $P_{1,1}$, $P_{2,1}$, $P_{3,1}$, where the uncorrected detection lines are generated by simply tracing the limit points of the touch signatures $P_{1,1}$, $P_{2,1}$, $P_{3,1}$ back across the touch surface along the respective scan angle. FIG. 13A also illustrates the corresponding corrected detection lines. Clearly, significant errors may be introduced in the mapping of detection lines to the touch surface if dispersion is ignored in the touch data extraction process. It is seen that if the touching object 6 is located close to the entry point, the factual width is essentially equal to the width of the touch signature. The corrected detection lines in FIG. 13A have been obtained by applying a dispersion function to the width of each touch signature $P_{1,1}$, $P_{2,1}$, $P_{3,1}$, such that the distance between the corrected detection lines corresponds to the factual width of a touching object 6 yielding the detected touch signature width (cf. FIG. 12B).

Figure 13B:
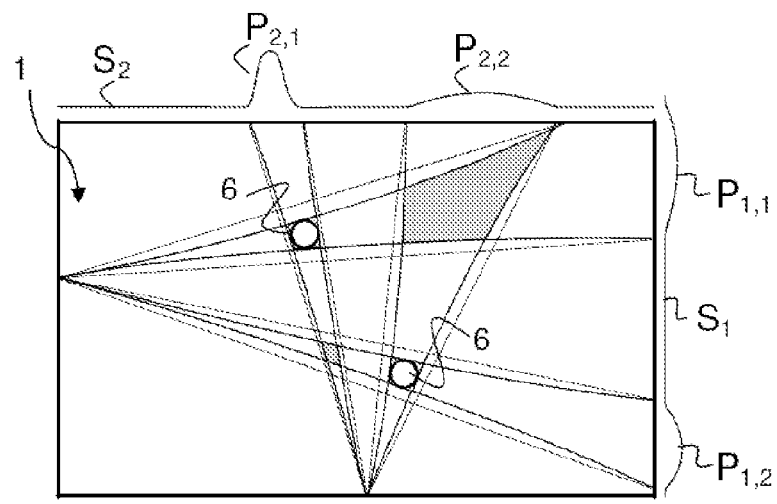

The dispersion function can be applied similarly to generate corrected detection lines in fan beam embodiments. One difference compared to the scan beam embodiments is that the fan beam generally originates from a smaller incoupling site and expands in the plane of the panel even in the absence of light scattering. Thus, in a fan beam embodiment, the touch signatures contain information about the distance between the entry point and the touching object, even if the panel is essentially free of light scattering phenomena. However, the presence of light scattering causes the fan beam to broaden in the plane of the panel while the fan beam propagates from the incoupling site towards the outcoupling site. Thus, a dispersion function can be measured or calculated for a specific fan beam embodiment. The basic principle for applying the dispersion function is the same as in the scan beam embodiments. FIG. 13B is a plan view of a fan beam embodiment and illustrates the projection signals $S_1$, $S_2$ for two light sheets. FIG. 13B indicates a pair of uncorrected detection lines (straight lines) for each touch signature $P_{1,1}$, $P_{2,1}$, $P_{2,2}$, where the uncorrected detection lines are generated by geometrically back-tracing the limit points of the touch signatures across the touch surface. FIG. 13B also illustrates the corresponding corrected detection lines, which are obtained by applying the appropriate dispersion function to the touch signatures $P_{1,1}$, $P_{1,2}$, $P_{2,1}$, $P_{2,2}$ in the transmission signals $S_1$, $S_2$. It is thus realized that, in presence of light scattering in a fan beam embodiment, a dispersion function may be applied to improve the touch data extraction process.

Irrespective of its origin, the width and/or the intensity profile of the detection lines may be determined theoretically, or experimentally in a calibration measurement.

Thus, depending on implementation and the required accuracy of the touch data to be extracted, it may be desirable to account for the non-ideal detection lines, i.e. the non-zero width and/or the intensity profile of the detection lines, in the model for the attenuation field.

This can be done by including the width/intensity profile in the evaluation of the line integral along the intersection between the detection line and the basis function, e.g. by defining the line integral as a surface integral that represents the width/intensity profile of the detection line, or by evaluating and aggregating a set of line integrals for rays extending side-by-side within the detection line, with each ray extending along the detection line and representing a specific lateral location within the detection line. In one embodiment, to be described in the following, the width and/or intensity profile of the detection lines are represented by a so-called "compensation kernel". The compensation kernel is a function which models the effects of the width and/or intensity profile of the detection lines, and which may be convolved with the above-mentioned projection kernels to generate a corrected projection kernel.

The shape of the compensation kernel may be obtained in a separate calibration step, and/or from a dispersion function (cf. FIG. 12). In one embodiment, a simplified, yet fairly accurate, compensation kernel is represented by a Gaussian bell with an area integral set to unity. Hence, the compensation kernel can be defined by only a single parameter, e.g. its width, half-width or height. The width of the compensation kernel depends on the characteristics of the FTIR system, including the touch panel, possibly with an AG structure, the design of incoupling and outcoupling optics, the characteristics of the light beams, etc.

FIG. 14 illustrates compensation kernels with a half width of 0.01 mm (top left), 0.5 mm (top right), 1 mm (middle left), 2 mm (middle right), 4 mm (bottom left) and 8 mm (bottom right). Note that the integral of the compensation kernels is maintained at unity.

FIG. 15A shows the result of convolving the respective compensation kernel in FIG. 14 with the projection kernel in FIG. 10A. We see that the corrected projection kernel becomes wider and lower as the width of the compensation kernel is increased. FIG. 15B shows the result of convolving the respective compensation kernel in FIG. 14 with the projection kernel in FIG. 10C, i.e. the triangle-shaped projection kernel.

By comparing FIGS. 15A and 15B, it can be noted that with a wider compensation kernel, which is e.g. obtained in FTIR systems with significant dispersion caused by scattering, the shape of the corrected projection kernel does not depend that much on the choice of basis function. However, in many FTIR systems, we have parts of the touch surface that are not as affected by dispersion, and other parts that are more so.

4.1.6 Determining Projection Kernels

From the above, it can be concluded that in a scan beam embodiment, with no or little dispersion, a single (corrected) projection kernel may be determined for each light sheet, and the same set of projection kernels are applicable for all grid points in the reconstruction grid. In a scan beam embodiment, with appreciable dispersion, the corrected projection kernels will vary across the reconstruction grid for each light sheet.

By analogy, it should also be realized that in a fan beam embodiment, with or without dispersion, the corrected projection kernels will vary across the reconstruction grid for each light sheet.

One approach to finding the corrected projection kernels is to use information about the optical design of the system to model the projection kernels theoretically, possibly based on experimental data, such as a dispersion function for the FTIR system.

Another approach is to determine the projection kernels empirically. For example, a small touch object with well-known touch characteristics may be positioned at different places over the whole touch surface and the resulting projection signals are recorded for the different positions of the touch object. From the recorded data, it is then possible to compute the corrected projection kernels of all the different basis functions.

If a high accuracy of the reconstructed attenuation field is required, the density of the reconstruction grid may become fairly high. Given the example of a 2 mm grid point separation, a touch surface in wide-screen format with a 30-inch diameter, would require a reconstruction grid consisting of more than 60,000 grid points. For reasons of throughput in manufacture, it may be undesirable to determine all corrected projection kernels for each individual item of an FTIR system. Instead, calculations or measurements may be undertaken on one or more reference items to determine corrected projection kernels for all or at least a major portion of the grid points. This high-density determination thus results in a generic set of projection kernels which is assumed valid for all items. To account for variations among the individual items, it is conceivable to undertake a low-density determination for each item, i.e. a determination of corrected projection kernels for a limited set of grid points. The low-density determination may involve any of the above-described methods for empirical determination of corrected projection kernels. Alternatively, the low-density determination involves theoretical determination of projection kernels, e.g. based on a preceding measurement of item-specific calibration parameters, such as scan angles, the dispersion function, the mapping of measurement values to outcoupling points, etc. Based on the low-density determination, all or a portion of the projection kernels in the generic set may be updated to properly reflect the detection line characteristics of the item.

4.2 Measurement Model

The real measurement process can be modeled as $$d = \mathcal{F}(\tilde{a}) + \epsilon$$

where d is the output vector containing the signal values, $\epsilon$ represents the noise in the measurement, $\tilde{a}$ is the real attenuation field, and $\mathcal{F}$ describes how a real attenuation field generates the measurement values. The real attenuation field has infinite dimensionality (is a function in the $R^2$ domain). The output from the measurement process $\mathcal{F}(\tilde{a})$ has a finite dimensionality (it is a function in the $R^2$ domain with output in the $Z^2$ domain). The measurement values are random variables since noise is introduced in the process. Both $\tilde{a}$ and $\mathcal{F}$ are deterministic with infinite dimensionality. However, we cannot obtain the true attenuation field or complete information about the measurement process. We can therefore treat them as random variables as well.

In order to reconstruct the attenuation field, the FTIR system may be described by a linear measurement model:

$$d = Pa + \epsilon$$

In this equation, d is the output vector containing the signal values, e.g. the logarithm of the transmission or the transmission values as such, a is the attenuation field to be reconstructed, and $\epsilon$ is the noise in the measurement. Both d and a are considered to be random variables since we lack complete information about the attenuation field. It should be noted that these variables are not scalar entities, but vectors. P is a matrix describing how the attenuation field affects the signal values.

Another variant of describing the FTIR system is to use a non-linear measurement model:

$$d = \mathcal{P}(a) + \epsilon$$

In this equation, $\mathcal{P}(a)$ describes how the attenuation field affects the signal values, i.e. the measurement model. Henceforth, we use this latter formulation to represent both linear and non-linear models, i.e. for a linear model $\mathcal{P}(a) = Pa$.

We model the attenuation field and measured values as random variables since we lack complete information about the attenuation field.

The model function $\mathcal{P}(a)$ may be determined by evaluating the interaction between every detection line and every single basis function in the reconstruction grid. As explained above, knowledge about the position, interpolation order, size and shape of the basis functions makes it possible to pre-compute how each basis function interacts with each detection line. The interaction may be represented by the aforesaid projection kernels. It should be noted that all basis functions do not interact with all detection lines, and it is thus possible to reduce the required number of computations.

The model function $\mathcal{P}(a)$ is, inter alia, influenced by the geometrical set-up of the FTIR system, including the size and thickness of the panel (which need not be rectangular), and the position the incoupling points and the outcoupling points that define the detection lines. The model function $\mathcal{P}(a)$ is also influenced by the optical properties of the FTIR system, such as widths of incoupling and outcoupling points, sheet generation mechanism, dispersion due to light scattering, and the attenuation mechanism, i.e. how plural touches along a detection line attenuate the light.

As stated above, the attenuation mechanism may be regarded as multiplicative, which enables certain simplifications that may serve to speed up the optimization significantly. In the following, $T_j$ is the transmission for detection line $D_j$, $r_{v,j}$ is the projection kernel coefficient for basis function $f_v$ and detection line $D_j$, and $a_v$ is the attenuation parameter (height) of the basis function $f_v$. The projection kernel coefficient $r_{v,j}$ represents the value obtained by mapping the detection line $D_j$ to the projection kernel (cf. dotted lines in FIG. 10). The total transmission (modeled) along the detection line $D_j$ is thus $$T_j = \prod_v T_{j,v} = \prod_v (1 - r_{v,j} \cdot a_v)$$

and the model function $\mathcal{P}(a)_j$ for detection line $D_j$ is thus $$\mathcal{P}(a)_j = \log(T_j) = \sum_v \log(1 - r_{v,j} \cdot a_v) \approx -\sum_v r_{v,j} \cdot a_v$$

This simplification only holds when $\log(1-x) \approx -x$, i.e. when x is much smaller than 1 (though still positive). The two equations above are suitable to use when we look at discrete points on the touch surface, the points being fairly large and separated by a distance. However, since we consider a set of basis functions, for which we have computed the correct line integrals, we can use the more correct definition of attenuation through an attenuating medium:

$$I_j = I_{0,j} \cdot e^{-\int a(x)dx} = I_{0,j} \cdot e^{-\sum_v r_{v,j} \cdot a_v},$$

which yields a more exact formula for the total transmission on detection line $D_j$:

$$T_j = \frac{I_j}{I_{0,j}} = e^{-\sum_v r_{v,j} \cdot a_v}.$$

This results in the same model function $\mathcal{P}(a)_j$ as above:

$$\mathcal{P}(a)_j = \log(T_j) = -\sum_v r_{v,j} \cdot a_v$$

From this, we see that the derivative, for a model function $\mathcal{P}(a)_j$ that results in logarithmic values of the transmission, becomes $$\frac{\partial \mathcal{P}(a)_j}{\partial a_v} = -r_{v,j}$$

If we choose to use the full transmission value as the output from the model function:

$$\mathcal{P}(a)_j = T_j = \prod_v T_{j,v} = \prod_v (1 - r_{v,j} \cdot a_v)$$

or $$\mathcal{P}(a)_j = T_j = e^{-\sum_v r_{v,j} \cdot a_v},$$

the derivative becomes:

$$\frac{\partial \mathcal{P}(a)_j}{\partial a_v} = -r_{v,j} \cdot T_j$$

4.3 Inversion

After having defined a measurement model $d = \mathcal{P}(a) + \epsilon$, and obtained an expression for the function $\mathcal{P}(a)$, the task remains to determine an expression that relates each attenuation value $a_v$ in the attenuation field a to the signal values $d_m$ in the output vector d. This task is denoted "inversion" in the following. The inversion may be done in several different ways. Below, we describe a statistical approach, based on Bayesian theory, and an alternative approach based on solving normal equations.

4.3.1 Bayesian Theory Applied to Inversion

The premise of Bayesian statistics is to incorporate prior knowledge, along with a given set of current measurement data, in order to make statistical inferences. The prior knowledge (also known as a priori information) could come from operational or observational data, from previous comparable experiments or from engineering knowledge. Here, a priori information represents prior knowledge about the behavior of the attenuation field, i.e. how touches and contaminants attenuates the light in the detection lines.

Bayes' formula gives the posterior distribution:

$$p(a|d) \propto p(a) p(d|a)$$

where p(a) is the prior distribution, i.e. our understanding of how the attenuation field behaves, independently of the output vector d, and p(d|a) is the likelihood distribution which represents the probability distribution of the signal values $d_m$ given the attenuation field a. The objective of the prior distribution is to give high probabilities to attenuation fields that we can expect and low probability to unexpected attenuation fields.

Once we have an expression for the posterior distribution p(a|d), which represents the probability distribution of the attenuation values in the attenuation field given the output vector d, we can find an estimate of the attenuation field. The estimate may, e.g., be recovered as the solution with the highest probability, i.e. the maximum a posteriori estimate (MAP).

The likelihood distribution may be modeled to represent the measurement noise. Commonly, the measurement noise may be considered to be random values from a Gaussian distribution. From this follows that the likelihood distribution may be modeled as:

$$p(d|a) = p_\epsilon(\mathcal{P}(a) - d) = e^{-\alpha \|\mathcal{P}(a) - d\|_2^2}$$

where $p_\epsilon(x)$ is a probability model for the Gaussian noise.

As noted above, the prior distribution p(a) should be unrelated to the measurement itself. Many different kinds of priors may be used to define the prior distribution p(a). Some examples of priors based on neighborhood structures are: smoothness (L2) and total variation. There are other types of priors as well, for instance L1-prior (also called impulse prior) and positivity constraint. In the context of an FTIR system, it may be relevant to study priors based on interaction between neighboring attenuation values, since the attenuation field can be expected to exhibit contiguous areas of low attenuation (no touch) and high attenuation (touch), respectively, with each area including several vertices, i.e. attenuation values. For instance, we could define a neighboring L2 smoothness prior:

$$p(a) = e^{-\gamma \sum_{n \in N} \|a - a_n\|_2^2}$$

where $a_n$ is the attenuation parameter of neighboring basis functions to a specific basis function in a. The summation formula is interpreted as the total sum over all basis functions and their neighbors. In the above example of a hexagonal grid, p(a) could be obtained by calculating, for every basis function, the sum of the squared difference in attenuation parameter value between the basis function and its six neighbors. For example, we may compute six differences and six squares for every basis function and then add these to the total sum over all basis functions.

This prior imposes a significant penalty on steep variations in attenuation. It therefore promotes smooth attenuation fields, which can be expected underneath a touch and on locations where there is no touch present. However, it can also be expected that edges of touches will appear as distinct and sharp changes in the attenuation field, and the smoothness prior might put a significant penalty on such changes. Thus, using the total variation prior may be more appropriate:

$$p(a) = e^{-\gamma \sum_{n \in N} |a - a_n|},$$

with $\sum_{n \in N} |a - a_n|$ being a so-called penalty factor, which represents the total sum of absolute differences in attenuation parameter value between neighboring basis functions. The total variation prior does not penalize large step changes in attenuation.

Figure 16:
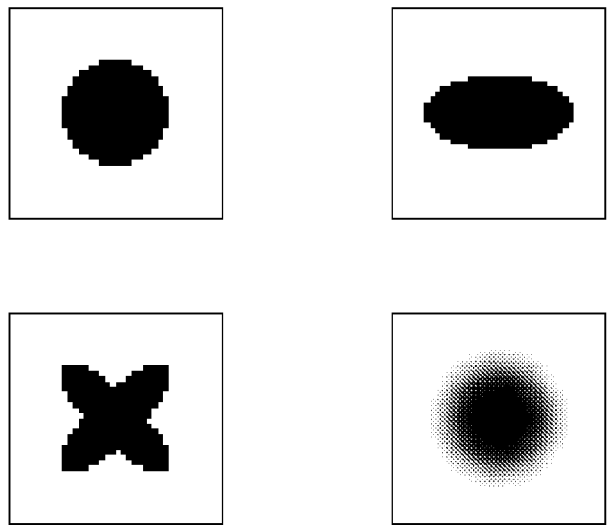
FIG. 16 illustrates four sample attenuation fields representing a touch shape.

The impact of the L2 smoothness and the total variation priors have been further evaluated for a rectangular grid with a four-neighborhood structure. In this evaluation, we have computed the penalty factor for the L2 smoothness prior and the total variation prior for four different simulated attenuation fields, shown in FIG. 16. The total attenuation (black is highest attenuation, with an attenuation that is set to 1 in arbitrary units) is the same in all four attenuation fields. In this evaluation, it was revealed that the circle (top left) yielded comparable values of the penalty factor for both priors. Similarly the ellipse (top right) yielded comparable penalty values for both priors, albeit slightly higher than for the circle. The cross (bottom left) yielded significantly higher penalty values for both priors. The smoothed circle (bottom right) yielded essentially the same penalty value as the circle, for the total variation prior, whereas the penalty value was significantly lower for the L2 smoothness prior. Thus, it is found that the L2 smoothness prior is ill suited for use in reconstruction of an attenuation field with touches.

Although there are many other priors that may be used, the following description focuses on the use of the total variation prior since it is a suitable prior and fairly straightforward to understand and implement.

Based on the foregoing, the posterior distribution may be modeled as:

$$p(a \mid d) = e^{-\alpha \|\mathcal{P}(a)-d\|_2^2} e^{-\gamma \sum_{n \in N} |a-a_n|} = e^{-\alpha \|\mathcal{P}(a)-d\|_2^2 - \gamma \sum_{n \in N} |a-a_n|}$$

It can be seen that retrieving the MAP is the same as minimizing the negative logarithm of this equation. Thus, the optimization may be expressed as:

$$MAP = \text{minimize}(-\log(p(a \mid d))) = \text{minimize}\left(\alpha \|\mathcal{P}(a)-d\|_2^2 + \gamma \sum_{n \in N} |a-a_n|\right)$$

Since both parts of this minimization equation are bounded from below (positive) and continuous, we can be certain that a solution exist. The ratio between the two constants, $\alpha$ and $\gamma$, defines whether the optimization is focused on agreement with measured data (signal values) or on agreement with the prior. The $\gamma/\alpha$ quotient may be specific to each FTIR system, but is generally in the approximate region of 0.01-0.75.

Figure 17:
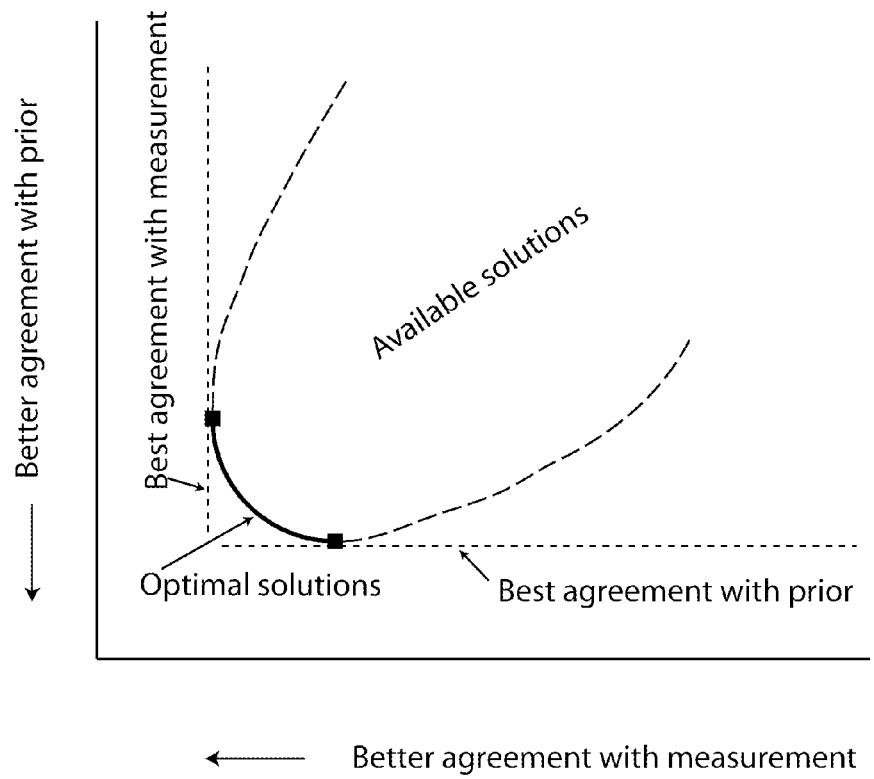
FIG. 17 is a graph that conceptually illustrates available solutions in statistical reconstruction based on Bayesian inversion.

Generally, the optimization involves choosing one solution (the most probable) from an infinite set of solutions. This aspect is further illustrated in FIG. 17.

Another prior that may be useful in the optimization is that all attenuation values must be positive. This can be formulated in an extra prior ("positivity prior") in the expression to be minimized: ... $+\phi \cdot f(a) \cdot \theta(-a)$, where $\theta(t)$ is the Heaviside step function and $f(x)$ is a positive function that grows with increasing absolute values of x, preferably growing faster than linear, e.g. $f(x)=x^2$. Using such an extra prior will cause large penalties on attenuation values that are much below zero. For ease of understanding, the positivity prior is omitted in the following discussion.

Many optimization algorithms operate on the derivative of the function to be optimized. The derivative of the first part of the minimization equation is fairly straightforward. However, the derivative of the total variation prior is not continuous. To this end, it may be beneficial to modify the total variation prior slightly to produce a prior with a continuous derivative. One example, among many, of a function that mimics the absolute value is $$|x| \sim \frac{1}{\tau} \log(\cosh(\tau \cdot x))$$

Figure 18A:
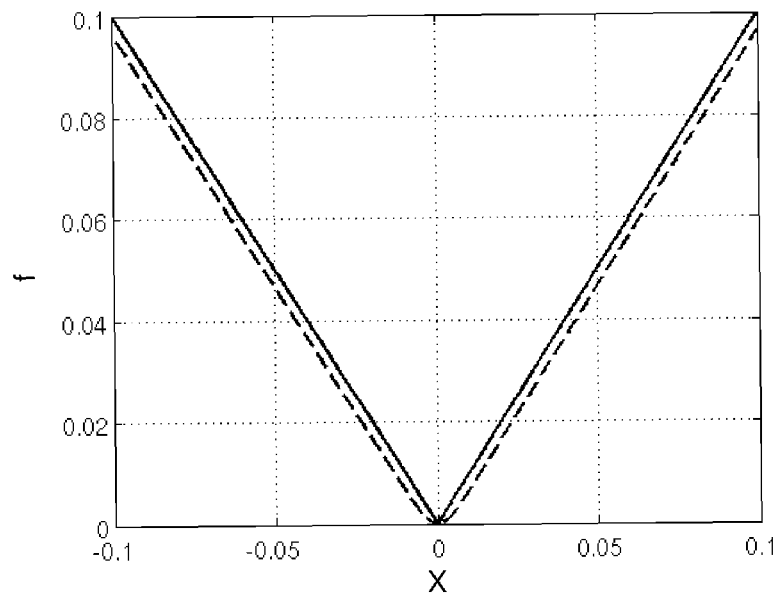
FIG. 18A is a graph of a function (dashed lines) that approximates an absolute value function (solid lines)

FIG. 18A illustrates the similarity between the absolute value (full lines) and the approximate function (dashed lines), which is evaluated for $\tau=200$. The derivative of approximate function is $$\frac{\sinh(\tau \cdot x)}{\cosh(\tau \cdot x)}$$

Figure 18B:
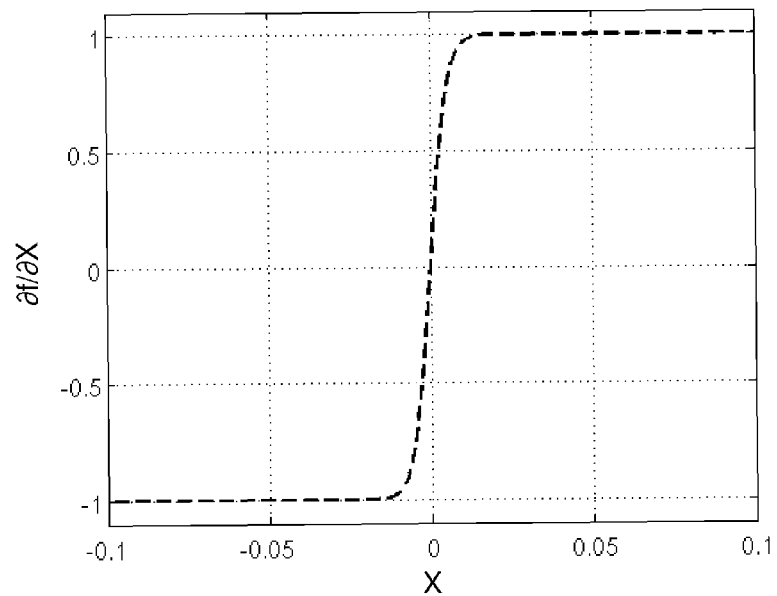
FIG. 18B is a graph of the derivative of the approximate function.

FIG. 18B shows the derivative as a function of x, and illustrates that the derivative is a smooth curve.

The derivative of the minimization equation for attenuation value $a_v$ may thus be expressed as:

$$\frac{\partial F}{\partial a_v} = \alpha \frac{\partial \mathcal{P}(a)}{\partial a_v}(\mathcal{P}(a)-d) + \gamma \sum_{n \in N_v} \frac{\sinh(\tau \cdot (a_v - a_n))}{\cosh(\tau \cdot (a_v - a_n))}$$

where $N_v$ is the set of neighbors for basis function $f_v$. The gradient for all attenuation values, i.e. the attenuation field, may thus be expressed as $$\nabla F = \begin{pmatrix} \frac{\partial F}{\partial a_1} \\ \frac{\partial F}{\partial a_2} \\ \ldots \\ \frac{\partial F}{\partial a_v} \end{pmatrix}$$

The skilled person realizes that any suitable optimization method may be used to find the attenuation field a that minimizes the function F, i.e. where the gradient $\nabla F$ becomes zero.

If the reconstruction grid is not regular hexagonal, there may be different distances between one vertex and its neighbors. For example, in a quadratic grid, each vertex will have eight neighbor vertices, four of which being located a factor of $\sqrt{2}$ further away from the vertex than the other four neighbors. It may therefore be beneficial to also weigh the impact of the total variation prior with the distance between center points of the neighboring basis functions.

It should also be understood that if the minimization equation to be minimized includes the above-mentioned positivity prior, such as ... $+\phi \cdot a^2 \cdot \theta(-a)$, its derivative should be added to the above expression $\partial F/\partial a_v$, e.g. as ... $+2 \cdot \phi \cdot a \cdot \theta(-a)$.

4.3.2 Inversion by Solving Normal Equations

If a linear measurement model is used to represent the FTIR system, and if no or only priors that enable a matrix formulation of the minimization problem are used, the solution to the minimization equation may be found by solving the normal equations. Such a solution approach is particularly relevant if the measurement model is over-determined. The normal equations can be formulated as:

$$(P^T P)a = P^T d$$

The equation can be solved analytically by using the following formula (if $P^T P$ is an invertible matrix):

$$a = (P^T P)^{-1}(P^T d)$$

However, this may not be the most efficient way to solve the equation system. A more efficient way to solve the normal equations may, e.g. be found by computing the Cholesky decomposition. Thus, if the matrix $P^T P$ is well-conditioned and positive definite, i.e. has full rank, the normal equations can be solved directly by using the Cholesky decomposition $R^T R = P^T P$, where R is an upper triangular matrix. The solution is found by a first forward substitution and a subsequent backward substitution of the following equation:

$$R^T R a = P^T d$$

Both operations are trivially performed since they are performed on triangular matrices. It should also be noted that the Cholesky decomposition can be computed once and does not have to be computed for every sensing instance.

It is also possible to find the solution by using orthogonal decomposition techniques such as QR decomposition. The use of orthogonal methods may yield more numerical stability in the solution but are generally less computationally efficient. Other suitable methods are also known to the person skilled in the art.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

In an alternative embodiment, each of the basis functions is designed to describe a respective touch on the touch surface. Like in the foregoing, a measurement model may be determined by evaluating the interaction between the detection lines and the basis functions. However, the location of each touch-describing basis function is suitably variable across the touch surface, such that the optimization process involves determining the location (as well as size, shape and attenuation parameter value) of the basis function(s) so as to obtain the signal values in the output vector. Such an embodiment may e.g. be useful when the attenuation field is considered to be zero (or near zero) where there are no touches. The touch-describing basis function may e.g. be in the form of a circle, an ellipse, or a two-dimensional Gaussian bell. Typically, the attenuation field is described by a set of mimicking basis functions that each describe a touch with a limited set of parameters. For example, a two-dimensional Gaussian bell can be described by 6 parameters: x- and y-position, height, largest width, smallest width and rotation. A circular or elliptical base function may e.g. be modeled as a top-hat function. The shape of these touch-describing basis functions may also be acquired empirically by measurements on the FTIR system.

The invention claimed is:

1. A method in a touch-sensing apparatus, said touch-sensing apparatus including a light transmissive panel that defines a touch surface and an opposite surface, a light source arrangement for providing sheets of light inside the light transmissive panel, wherein said sheets of light include light that propagates by internal reflection between the touch surface and the opposite surface, and a light sensor arrangement for measuring transmitted light energy, wherein the light source arrangement and the light sensor arrangement are arranged to define a grid of detection lines on the touch surface, each detection line representing a light path across the touch surface from the light source arrangement to the light sensor arrangement, and wherein the touch-sensing apparatus is configured such that one or more objects touching the touch surface causes a local attenuation in said grid of detection lines, said method comprising:

obtaining an output vector containing signal values indicative of light received by the light sensor arrangement on a set of detection lines;

representing a two-dimensional attenuation field on the touch surface by at least one two-dimensional basis function, wherein the or each basis function defines an attenuation strength within the two-dimensional extent of the or each respective basis function, and the or each basis function overlaps with at least one other basis function; and calculating an estimated attenuation field, based on a mapping of said set of detection lines to the or each basis function, by optimizing at least one of the attenuation strength and the location of the or each basis function such that the estimated attenuation field yields the output vector; and processing the estimated attenuation field for extraction of touch data relating to said one or more objects.

2. The method of claim 1, wherein the two-dimensional attenuation field is represented by a plurality of basis functions, which are arranged in a reconstruction grid on the touch surface.

3. The method of claim 2, wherein each of the plurality of basis functions has a given placement in the reconstruction grid and is defined by an attenuation parameter.

4. The method of claim 3, wherein the attenuation parameter is the attenuation strength at the center point of the two-dimensional extent.

5. The method of claim 3, wherein signal values for each of the sheets of light form a projection signal, which is indicative of a spatial distribution of light within an outcoupling site on the light transmissive panel, said method further comprising:

identifying, for each of the sheets of light, a sheet kernel for each basis function, wherein the sheet kernel is generated to represent the resulting projection signal when the basis function attenuates the sheet of light.

6. The method of claim 5, wherein said mapping is generated, for each detection line, by:

identifying all intersections between the detection line and said plurality of basis functions; and deriving, for each of the plurality of basis functions that intersects the detection line, an attenuation fraction value by mapping the intersection to the sheet kernel.

7. The method of claim 6, wherein said mapping is further generated by:

estimating each output value in the output vector as $\Sigma r_{v,j} \cdot a_v$, wherein the sum is calculated over all of the plurality of basis functions that intersect a detection line, $r_{v,j}$ is the attenuation fraction value and $a_v$ is the attenuation parameter of the respective basis function.

8. The method of claim 5, wherein the sheet kernel is generated by:

generating an estimated sheet kernel by estimating an attenuation of the sheet of light caused by the basis function, as a function of distance to a light ray in the sheet of light passing through the center of the basis function.

9. The method of claim 8, wherein the sheet kernel is further generated by:

obtaining a compensation kernel which represents a dependence of signal profile width on a location of the basis function on the touch surface due to light scattering caused by at least one of the touch surface and the opposite surface, and modifying the estimated sheet kernel based on the compensation kernel.

10. The method of claim 9, wherein the width of the compensation kernel is determined based on a width function that represents the factual width of an object that generates a given signal feature in the projection signal, as a function of distance to the outcoupling site.

11. The method of claim 5, further comprising:
obtaining a generic model function for a series of corresponding touch-sensing apparatuses;
measuring calibration parameters for an individual touch-sensing apparatus in said series of corresponding touch-sensing apparatuses; and
obtaining an item-specific model by adapting the sheet kernels, which are used in the generic model function, based on the calibration parameters.

12. The method of claim 2, wherein each of the plurality of basis functions is centered on a respective vertex in the reconstruction grid.

13. The method of claim 2, wherein the reconstruction grid is triangular.

14. The method of claim 2, wherein the plurality of basis functions have an identical two-dimensional extent.

15. The method of claim 14, wherein each of the plurality of basis functions has a hexagonal extent.

16. The method of claim 2, wherein each of the plurality of basis functions defines a decreasing attenuation with increasing distance from the center point of the two-dimensional extent.

17. The method of claim 16, wherein each of the plurality of basis functions has zero attenuation at all but one vertex in the reconstruction grid.

18. The method of claim 2, wherein said calculating the estimated attenuation field is based on Bayesian inversion according to:

$$p(a|d) = \kappa \cdot p(a) \cdot p(d|a),$$

wherein a is an attenuation vector containing one attenuation value for each basis function, $\kappa$ is a constant, p(a) is a prior distribution which represents a probability distribution of attenuation values in the attenuation field independently of the output vector, p(d|a) is a likelihood distribution which represents a probability distribution of signal values given the attenuation vector a, and p(a|d) represents a probability distribution of the attenuation values given the output vector d.

19. The method of claim 18, wherein the prior distribution p(a) includes a total variation prior.

20. The method of claim 19, wherein the total variation prior is given as a function of the sum of absolute differences between neighboring attenuation values within the attenuation field.

21. The method of claim 18, wherein the likelihood distribution p(d|a) is modeled to represent measurement noise.

22. The method of claim 21, wherein the measurement noise is represented by a Gaussian distribution.

23. The method of claim 21, wherein the measurement noise is calculated as a difference between the output vector d and a model function P(a), which represents said mapping and provides an estimate of the output vector d given the attenuation vector a.

24. The method of claim 23, wherein the probability distribution p(a|d) is given by:

$$e^{-\alpha \|P(a)-d\|_2^2} e^{-\gamma \Sigma_{n \in N} |a-a_n|},$$

with $\alpha$ and $\gamma$ being constants, P(a) being the model function, and $\Sigma |a-a_n|$ being the sum of absolute differences between neighboring attenuation values within the attenuation field.

25. The method of claim 18, wherein the calculating the estimated attenuation field comprises:
finding the attenuation vector a that maximizes the probability distribution P(a|d).

26. The method of claim 25, further comprising:
sequentially estimating the attenuation field for a time-sequence of output vectors d, wherein an attenuation vector found for a preceding output vector is used as starting point for finding the attenuation vector for a current output vector.

27. The method of claim 1, wherein said mapping is generated, for each detection line, as an aggregation of line integrals, wherein each of the line integrals is evaluated along an intersection between the detection line and a respective basis function.

28. The method of claim 27, wherein said mapping is generated to account for at least one of a width and an intensity profile of the detection line.

29. The method of claim 1, further comprising:
obtaining a generic mapping for a series of corresponding touch-sensing apparatuses;
measuring calibration parameters for an individual touch-sensing apparatus in said series of corresponding touch-sensing apparatuses; and
obtaining an item-specific mapping by adapting the generic mapping based on the calibration parameters.

30. The method of claim 1, wherein said obtaining comprises:
obtaining measurement values representing received light energy on the set of detection lines; and
normalizing the measurement values by a respective background value.

31. The method of claim 30, wherein the background value represents the received light energy without objects touching the touch surface.

32. The method of claim 30, wherein said normalizing represents a division of each measurement value by the background value.

33. The method of claim 30, wherein said obtaining comprises:
calculating a logarithm of the measurement values.

34. The method of claim 1, wherein said touch data comprises at least one of a position, an area, a shape and a pressure for the one or more objects.

35. A non-transitory computer-readable storage medium comprising computer code which, when executed on a data-processing system, is adapted to carry out the method of claim 1.

36. A device for extracting touch data related to one or more objects on a touch surface included in a touch-sensing apparatus, said touch-sensing apparatus including a light transmissive panel that defines the touch surface and an opposite surface, a light source arrangement for providing sheets of light inside the panel, wherein said sheets of light comprise light that propagates by internal reflection between the touch surface and the opposite surface, and a light sensor arrangement for measuring transmitted light energy, wherein the light source arrangement and the light sensor arrangement are arranged to define a grid of detection lines on the touch surface, each detection line representing a light path across the touch surface from the light source arrangement to the light sensor arrangement, and wherein the touch-sensing apparatus is configured such that said one or more objects touching the touch surface causes a local attenuation in said grid of detection lines, said device comprising:

an element for obtaining an output vector containing signal values indicative of light received by the light sensor arrangement on a set of detection lines;

an element for representing a two-dimensional attenuation field on the touch surface by at least one two-dimensional basis function, wherein the or each basis function defines an attenuation strength within the two-dimensional extent of the or each basis function, and the or each basis function overlaps with at least one other basis function;

an element for calculating an estimated attenuation field, based on a mapping of said set of detection lines to the or each basis function, by optimizing at least one of the attenuation strength and the location of the or each basis function such that the estimated attenuation field yields the output vector; and an element for processing the estimated attenuation field for extraction of said touch data.

37. A method in a touch-sensing apparatus, said apparatus including a light transmissive panel that defines a touch surface and an opposite surface, a light source arrangement for providing sheets of light inside the panel, wherein said sheets of light include light that propagates by internal reflection between the touch surface and the opposite surface, and a light sensor arrangement for measuring transmitted light energy, wherein the light source arrangement and the light sensor arrangement are arranged to define a grid of detection lines on the touch surface, each detection line representing a light path across the touch surface from the light source arrangement to the light sensor arrangement, and wherein the touch-sensing apparatus is configured such that one or more objects touching the touch surface causes a local attenuation in said grid of detection lines, said method comprising:

obtaining an output vector d containing signal values indicative of light received by the light sensor arrangement on a set of detection lines;

representing a two-dimensional attenuation field on the touch surface by attenuation values contained in an attenuation vector a, estimating the attenuation field by Bayesian inversion based on Bayes' formula:

$$p(a|d) = \kappa \cdot p(a) \cdot p(d|a),$$

wherein $\kappa$ is a constant, $p(a)$ is a prior distribution which represents the probability distribution of the attenuation values independently of the output vector d, $p(d|a)$ is a likelihood distribution which represents the probability distribution of the signal values given the attenuation vector a, and $p(a|d)$ represents the probability distribution of the attenuation values given the output vector d; and processing the estimated attenuation field for extraction of touch data relating to said one or more objects.

* * * * *